US012744340B2

(12) United States Patent
Wang et al.

(10) Patent No.: US 12,744,340 B2
(45) Date of Patent: Sep. 22, 2026

(54) CYLINDRICAL TERMINAL, PLUG-IN CONNECTION STRUCTURE, AND METHOD FOR MACHINING CYLINDRICAL TERMINAL

(71) Applicant: Changchun Jetty Automotive Technology Co., Ltd., Changchun (CN)

(72) Inventors: Chao Wang, Changchun (CN); Yun Miao, Changchun (CN)

(73) Assignee: CHANGCHUN JETTY AUTOMOTIVE TECHNOLOGY CO., LTD., Changchu (CN)

( * ) Notice: Subject to any disclaimer, the term of this patent is extended or adjusted under 35 U.S.C. 154(b) by 318 days.

(21) Appl. No.: 18/579,387

(22) PCT Filed: Jul. 15, 2022

(86) PCT No.: PCT/CN2022/106005
§ 371 (c)(1),
(2) Date: Jan. 15, 2024

(87) PCT Pub. No.: WO2023/284861
PCT Pub. Date: Jan. 19, 2023

(65) Prior Publication Data

US 2024/0339775 A1 Oct. 10, 2024

(30) Foreign Application Priority Data

Jul. 15, 2021 (CN) ......................... 202110803204.9
Jul. 15, 2021 (CN) ......................... 202121613435.5

(51) Int. Cl.
*H01R 13/04* (2006.01)
*H01R 13/03* (2006.01)
*H01R 43/16* (2006.01)

(52) U.S. Cl.
CPC ............. *H01R 13/04* (2013.01); *H01R 13/03* (2013.01); *H01R 43/16* (2013.01)

(58) Field of Classification Search
CPC ...... H01R 13/04; H01R 13/03; H01R 13/111; H01R 43/16
(Continued)

(56) References Cited

U.S. PATENT DOCUMENTS 4,572,606 A * 2/1986 Neumann ............ H01R 13/187 29/882
4,752,253 A * 6/1988 Neumann .............. H01R 13/05 439/825
(Continued)

FOREIGN PATENT DOCUMENTS

CN 101986470 A 3/2011
CN 102804511 A 11/2012
(Continued)

OTHER PUBLICATIONS

The Second Office Action issued on Aug. 2, 2025 for counterpart Chinese patent application No. 202110803204.9, 19 pages with translation.
(Continued)

*Primary Examiner* — Gary F Paumen
(74) *Attorney, Agent, or Firm* — Tucker Ellis LLP

(57) ABSTRACT

A cylindrical terminal, including a contact section (10), a fixing section (20) and a connecting section (30). The fixing section (20) includes an extension section (201) and an assembly portion (202) that is injection-molded on the extension section (201). The contact section (10), the extension section (201) and the connecting section (30) are integrally formed as a cylindrical tube. The contact section (10) is provided with at least two axial slots (102), such that a side wall of the extension section (10) is divided into at
(Continued)

least two contact elastic sheets (103). The extension section (10) is provided with a depression that is recessed radially inward, such that the contact elastic sheets form arc-shaped structures. The plug-in connection structure includes a plug-in terminal (40) and the cylindrical terminal. A method for machining the cylindrical terminal is also provided.

18 Claims, 13 Drawing Sheets

(58) Field of Classification Search
USPC .......................................... 439/886, 851, 857
See application file for complete search history.

(56) References Cited

U.S. PATENT DOCUMENTS

| | | | | |
|---|---|---|---|---|
| 5,013,267 | A | 5/1991 | Watanabe | |
| 5,667,413 | A * | 9/1997 | Trafton | H01R 13/187<br>439/271 |
| 6,656,002 | B2 * | 12/2003 | Zhao | H01R 13/187<br>439/787 |
| 7,462,078 | B2 * | 12/2008 | Mao | H01R 13/187<br>439/843 |
| 7,682,208 | B2 * | 3/2010 | Bankstahl | H01R 13/53<br>439/337 |
| 8,317,552 | B2 * | 11/2012 | Leroyer | H01R 13/18<br>439/839 |
| 2005/0048851 | A1 * | 3/2005 | Okita | H01R 43/16<br>29/874 |
| 2012/0052750 | A1 | 3/2012 | Leroyer et al. | |
| 2014/0017960 | A1 * | 1/2014 | Friedhof | H01R 13/187<br>29/882 |
| 2016/0197426 | A1 * | 7/2016 | Kawaguchi | H01R 13/111<br>439/877 |
| 2017/0348750 | A1 | 12/2017 | Wen | |
| 2018/0212370 | A1 | 7/2018 | Xu | |
| 2020/0136288 | A1 | 4/2020 | Ilie | |

FOREIGN PATENT DOCUMENTS

| | | | |
|---|---|---|---|
| CN | 102896189 | A | 1/2013 |
| CN | 104107852 | A | 10/2014 |
| CN | 104901027 | A | 9/2015 |
| CN | 105932465 | A | 9/2016 |
| CN | 206524422 | U | 9/2017 |
| CN | 107394445 | A | 11/2017 |
| CN | 207282773 | U | 4/2018 |
| CN | 207743426 | U | 8/2018 |
| CN | 108616004 | A | 10/2018 |
| CN | 208797260 | U | 4/2019 |
| CN | 209045850 | U | 6/2019 |
| CN | 110024235 | A | 7/2019 |
| CN | 211853077 | U | 11/2020 |
| CN | 113471733 | A | 10/2021 |
| CN | 216251220 | U | 4/2022 |
| JP | 2011171166 | A | 9/2011 |
| JP | 2012221774 | A | 11/2012 |
| JP | 2012531021 | A | 12/2012 |
| JP | 2015125861 | A | 7/2015 |
| WO | 2018104378 | A1 | 6/2018 |

OTHER PUBLICATIONS

Office Action from corresponding Japanese Application No. 2024-501824, mailed on May 26, 2025, 6 pages with translation.
Office Action and Search Report from corresponding Chinese Application No. 202110803204.9, mailed Apr. 15, 2025, 25 pages with translation.
European Office Action issued on Jul. 15, 2025 for counterpart European patent application No. 22841494.2, 7 pages.
Extended European Search Report from corresponding Application No. 22841494.2 mailed on Oct. 11, 2024, 11 pages.
Japanese Office Action from corresponding Application No. 2024-501824 mailed on Nov. 12, 2024, 14 pages.
International Search Report from corresponding International Application No. PCT/CN2022/106005, mailed on Dec. 6, 2022, 4 pages with translation.
Notice for grant issued for corresponding Japanese Patent Application 2024-501824 mailed on Nov. 18, 2025, 5 pages with translation.
Office Action issued on Oct. 10, 2025 for counterpart Vietnam patent application No. 1-2024-01040, 4 pages with translation.

* cited by examiner

CYLINDRICAL TERMINAL, PLUG-IN CONNECTION STRUCTURE, AND METHOD FOR MACHINING CYLINDRICAL TERMINAL

RELATED APPLICATION

The present application is a National Stage of International Application No. PCT/CN2022/106005, filed Jul. 15, 21022, and claims priority to Chinese Invention patent application Ser. No. 20/211,0803204.9, filed on Jul. 15, 2021, and Chinese Utility Model patent application Ser. No. 20/212,1613435.5, filed on Jul. 15, 2021, which are hereby incorporated by reference in their entireties.

TECHNICAL FIELD

The present application relates to the field of electrical connection, in particular to a cylindrical terminal, a plug-in connection structure and a method for machining the cylindrical terminal.

BACKGROUND

In the field of electrical connection, there are many electrical circuits that require plug-in terminals for connection. At present, a male terminal and a female terminal are usually used to realize plug-in connection, especially in a harness with high current and large wire diameter. For example, in the new energy automobiles that are developing rapidly, the charging gun head and the charging base for charging the battery are internally provided with male terminals and female terminals that plugged with each other. Because the carrying current is large, the cross-sectional area of the plug-in terminal is required to be large. The existing commonly used plug-in terminals are all obtained by performing a turning process on copper rods, which has a low material utilization rate, adopts a complex machining process and takes a long machining time, especially the processing of female terminals, the waste of copper is more, resulting in the cost of the charging system cannot be reduced.

In addition, in order to realize the assembly and sealing of the terminal on an electrical device, it is necessary to provide an assembling area and a sealing area in addition to the electrical function area of the terminal, which also requires a complicated processing process and will lose part of raw materials, leading to an even lower material utilization rate.

Therefore, there is an urgent need for a new solution to solve the above problems in the prior art.

SUMMARY

The present application provides a cylindrical terminal, a plug-in connection structure and a method for machining the cylindrical terminal, which improve the utilization rate of machining materials of the terminal, adopt a simple machining process, take short time and greatly reduce the production cost of the terminal.

The present application provides the technical solution as below.

An embodiment of the first aspect of the present application provides a cylindrical terminal including a contact section, a fixing section and a connecting section. The fixing section includes an extension section and an assembly portion that is disposed on the extension section. The contact section, the extension section and the connecting section are integrally formed as a cylindrical tube. The contact section is provided with at least two axial slots, which divide a side wall of the contact section into at least two contact elastic sheets. The contact section is recessed radially inward, such that the contact elastic sheets are arc-shaped structures. The connecting section is electrically connected with a wire.

An embodiment of the second aspect of the present application provides a plug-in connection structure, including the cylindrical terminal as described in the embodiment of the first aspect and a plug-in terminal. The plug-in terminal is inserted into the contact section, and an outer side wall of the plug-in terminal is closely fitted with inner side walls of the contact elastic sheets.

An embodiment of the third aspect of the present application provides a machining method for manufacturing a cylindrical terminal according to the embodiment of the first aspect, including:

step S10: preparing a cylindrical tube;

step S20: preparing an extruder and a mold that comprises an inner mold and an outer mold, in which the inner mold is provided with arc-shaped recesses and first grooves, and the outer mold is provided with arc-shaped convexes and shearing tables;

step S30: placing the inner mold into the cylindrical tube, and then putting them together into the outer mold;

step S40: starting the extruder, so that the arc-shaped convexes of the outer mold move to the arc-shaped recesses of the inner mold, and extrude the contact section of the cylindrical tube to make it recess inwardly;

step S50: driving, by the extruder, the shearing tables of the outer mold to continue to move, so that the shearing tables cooperate with the first grooves of the inner mold to extrude the contact section of the cylindrical tube to form axial slots; and step S60: driving, by the extruder, the outer mold back to its original position, taking the extruded cylindrical tube and the inner mold out of the outer mold, and taking out the inner mold.

Optionally, the extruder in the steps S20, S40, S50 and S60 is a rolling machine.

The present application can produce the following beneficial effects.

1. The cylindrical terminal of the present application is machined by using a cylindrical tube without using rod-like materials, which can greatly improve the material utilization rate.
2. The cylindrical terminal of the present application is machined by an extruder or a rolling machine, the extruder or the rolling machine are used to machine the depression and the slots on the contact section and the openings on the extension section at one time, which does not require a complex mechanical machining process and reduces the machining time.
3. For the cylindrical terminal of the present application, an assembly portion may be directly injection-molded on the cylindrical tube, rather than machining on the cylindrical tube material, which can reduce the waste material and can machine complex assembly shapes.
4. For the cylindrical terminal of the present application, the assembly portion can be provided with a first groove to assemble a sealing ring, or the sealing ring can be directly injection-molded on the assembly portion, which reduces the complexity of machining process and reduces machining time.
5. In the present application, contact elastic sheets having elasticity are provided such that the contact section can adapt to the machining error of the plug-in terminal, so that the binding force between the cylindrical terminal and the plug-in terminal is larger, to guarantee more contact area and achieve better electrical and mechanical properties.

6. For the cylindrical terminal of the present application, the section shape of an inner hole of the contact portion is designed into various shapes, which is convenient for the designers to select cylindrical terminals of different shapes according to the actual cylindrical terminal layout environment, reduce the volume of the plug-in structure, optimize the contact area, and enhance the electrical performance of the cylindrical terminal.
7. For the cylindrical terminal of the present application, an elastic ferrule can be provided, and when the cylindrical terminal itself has insufficient elasticity due to design reasons, the elastic ferrule can be used to supplement the gripping force between the cylindrical terminal and the plug-in terminal.
8. In the cylindrical terminal of the present application, tellurium-copper alloy is adopted, so that the terminal has good conductive performance and free-machining property, thereby ensuring the electrical property and improving the processability, in addition, the elasticity of the tellurium-copper alloy is also excellent.
9. In the cylindrical terminal of the present application, a plating layer is adopted to better increase anti-corrosion performance, and exemplarily a composite plating layer is adopted to better improve the firmness of the plating, and after multiple times of plugging and unplugging, it is still possible to ensure non-falling and anti-corrosion performance of the plating layer.

DETAILED DESCRIPTION OF EMBODIMENTS

Hereinafter the present application is described in further detail, so that those skilled in the art can implement the invention with reference to the text of the specification. For a clearer understanding of the technical features, objects and effects of the present application, specific embodiments of the present application will now be described with reference to the accompanying drawings. The terms "first," "second," etc. are used for descriptive purpose only and are not to be construed as indicating or implying relative importance or implicitly indicating the number of the indicated technical features, whereby features defined with "first," "second," etc. may explicitly indicate or implicitly include one or more of the features. In description of the present application, "a plurality of" means two or more, unless otherwise indicated. In the description of the present application, unless otherwise stated, the term "connection" is to be understood in a broad sense, for example, it may be fixed connection, detachable connection, direct connection or indirect connection through an intermediate element, and the specific meaning of the term in this patent may be understood by those ordinarily skilled in the art according to specific circumstances.

First Embodiment

Figure 1:
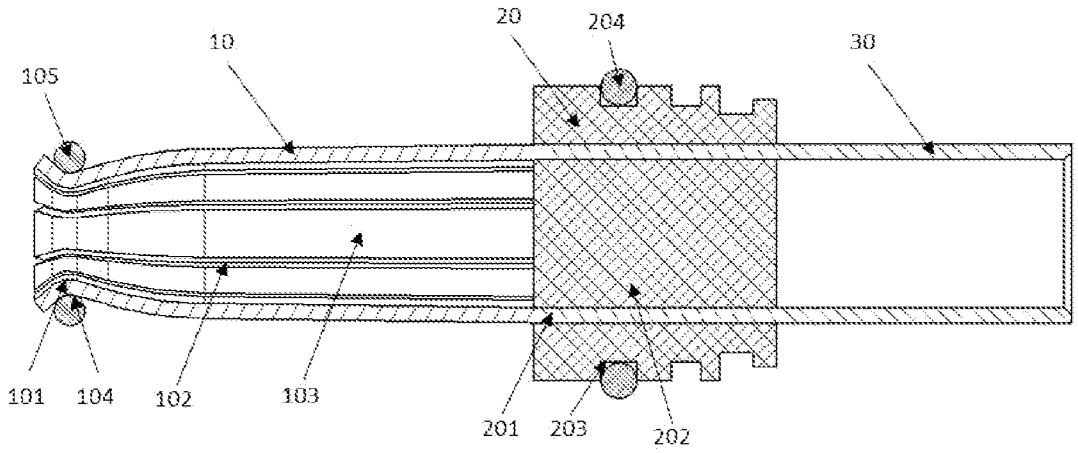
FIG. 1 is a section view of a cylindrical terminal according to the present application.

The present application provides a cylindrical terminal, as shown in FIG. 1, including a contact section 10, a fixing section 20 and a connecting section 30. The fixing section 20 includes an extension section 201 and an assembly portion 202 disposed on the extension section 201. The contact section 10, the extension section 201 and the connecting section 30 are integrally formed as a cylindrical tube. The contact section 10 is provided with at least two axial slots 102, and the slots 102 divide a side wall of the contact section 10 into at least two contact elastic sheets 103. The contact section 10 is provided with a depression 101 that is recessed radially inward, such that the contact elastic sheets 103 form arc-shaped structures. The connecting section 30 is electrically connected to a wire.

According to the cylindrical terminal of the present application, the contact section 10 is provided, and an interior of the contact section 10 is a cavity with at least one end of the cavity being opened, so that the cylindrical terminal can be in plug-in connection with the plug-in terminal 40 to realize electrical conduction. The contact section 10 is provided with at least two axial slots 102, such that a side wall of the contact section 10 is divided into at least two contact elastic sheets 103, thus the contact section 10 can adapt to the machining error of the plug-in terminal 40, and the contact elastic sheets 103 can be in contact connection with the plug-in terminal 40 respectively, thereby increasing the contact area between the contact section 10 and the plug-in terminal 40, reducing the contact resistance, and avoiding improper contact between the contact section 10 and the plug-in terminal 40 due to uneven or unsmooth surface of the plug-in terminal 40 to further avoid a combustion accident caused by excessive heating of the plug-in terminal structure. The contact section 10 is provided with a depression 101 that is recessed radially inward, such that the contact elastic sheets 103 form arc-shaped structures, thus the contact elastic sheets 103 have an inward elastic force, which makes the binding force between the contact section 10 and the plug-in terminal 40 be greater. The arc-shaped structures of the contact elastic sheets 103 is deformed by adapting to the surface of the plug-in terminal 40 to ensure more contact area and achieve better electrical and mechanical properties, thereby solving the problem that the existing cylindrical terminals cannot meet the requirements of mechanical properties and temperature rise.

According to the cylindrical terminal of the present application, the fixing section 20 is provided, and includes an extension section 201 and an assembly portion 202 disposed on the extension section 201. One end of the extension section 201 is connected to and can be electrically connected to the contact section 10, and the other end of the extension section 201 is connected to and can be electrically connected to the connecting section 30. The assembly portion 202 may be formed by extruding or rolling the extension section 201, or may be formed by using an injection molding machine to injection-mold a plastic material directly onto the extension section 201. The assembly portion 202 is fixedly connected to the extension section 201, and the assembly portion 202 is assembled and fixed at an installation position of an electrical device, so that the cylindrical terminal can be fixed at a corresponding position of the electrical device and can be easily connected to the plug-in terminal 40.

According to the cylindrical terminal of the present application, the connecting section 30 is provided and is electrically connected with a wire to realize transmission of electrical energy and signals. The cross-sectional shape of the connecting section 30 may be circular, oval, an opened ring, a U shape, a flat shape, or polygon. Different cross-sectional shapes can be selected according to the cross-sectional shape of the mating wire or the corresponding connection mode. The connecting section 30 may be connected with the wire by crimping or welding. Crimping refers to that mechanical deformation is adopted to apply pressure to make the connecting section 30 and its internal wire portion deform, so that the wire and the connecting section 30 are in full contact internally and are connected together by frictional force. Welding methods include ultrasonic welding, resistance welding, arc welding, pressure welding, electromagnetic welding, laser welding and other welding methods, by which the connecting section 30 and part of the wire are welded together to achieve stable electrical and mechanical properties.

The ultrasonic welding is to transmit high-frequency vibration waves to surfaces of two to-be-welded objects, so that the surfaces of the two objects rub against each other under pressure to form a fuse molecular layer.

The resistance welding refers to a method of welding by passing strong current through a contact point between an electrode and a workpiece to generate heat by a contact resistance.

The arc welding is to convert electric energy into heat energy and mechanical energy that are needed for welding by using electric arc as a heat source and using the physical phenomenon of air discharge, so as to connect metals. The arc welding mainly includes shielded metal arc welding, submerged arc welding and gas shielded welding, etc.

The pressure welding method is a method of applying pressure to weldments to make binding surfaces of them be in close contact to generate a certain plastic deformation to complete the welding.

The electromagnetic welding method refers to use of an electromagnetic induction ring to produce short but very strong current from a pulse generator, and the electromagnetic field generated by the induction ring can cause the materials to be welded to be instantly collided and extruded together.

The laser welding is an efficient and precise welding method using a laser beam with high energy density as a heat source.

In the cylindrical terminal of the present application, as shown in FIG. 1, the slots 102 on the contact section 10 penetrate through one end of the contact section 10 that is away from the fixing section 20, so that one end of each contact elastic sheet 103 is a free end. Such contact elastic sheets 103 can adapt to the machining error of the plug-in terminal 40, and the plurality of contact elastic sheets 103 can be in contact connection with the plug-in terminal 40 respectively, thereby increasing the contact area between the contact section 10 and the plug-in terminal 40, reducing the contact resistance, and avoiding improper contact between the contact section 10 and the plug-in terminal 40 due to uneven or unsmooth surface of the plug-in terminal 40 to further avoid a combustion accident caused by excessive heating of the plug-in terminal structure. Since one end of the contact elastic sheet 103 is a free end, the contact force thereof with the plug-in terminal 40 is guaranteed by the material elasticity of the contact elastic sheet 103 itself. If the contact elastic sheet 103 has little elasticity and is not easy to recover by itself after deformation, it is suitable for application scenarios where the conduction current is small, the tolerance of the plug-in terminal 40 is large, and the relative activity after plug-in connection is small.

In the cylindrical terminal of the present application, a width of one end of each slot 102 of the contact section 10 that is close to the fixing section 20 is greater than or equal to a width of one end of the slot that is away from the fixing section 20. The end of the slot 102 of the contact section 10 that is away from the fixing section 20, is generally located at a position where the contact elastic sheets 103 come into contact with the plug-in terminal 40, so in order to obtain a larger contact area, the smaller the width of the end of the slot 102 of the contact section 10 that is away from the fixing section 20 is, the better it is. In addition, since water and sediment may enter into the cavity of the contact section 10 during use, in order to make the performance of the plugged structures be better and the service life be longer, it is necessary to design positions for sediment discharge and water drainage on the cylindrical terminal, therefore, the larger the width of the end of the slot 102 of the contact section 10 that is close to the fixing section 20 is, the better the sediment discharge and water drainage performance is.

For the cylindrical terminal of the present application, in an embodiment requiring a less complex shape of the fixing section, the assembly portion 202 may be formed by performing extrusion or rolling directly on the extension section 201, without the need to add other machining methods or other components, so that the assembly portion is simple to machine and can be machined together with the slots and the depression 101 to save the machining hours and improve production efficiency.

For the assembly portion 202 of the cylindrical terminal of the present application, when the shape of the fixing section is required to be complex, or when additional components are needed to perform an assembling, the assemble portion 202 may be machined and molded by injection molding, in this case, the assembly portion 202 is generally made of a plastic material. The injection molding process is mature and takes short machining time. In addition, the plastic material has high strength, which can achieve to stably fix the cylindrical terminal to the electrical device.

Figure 2:
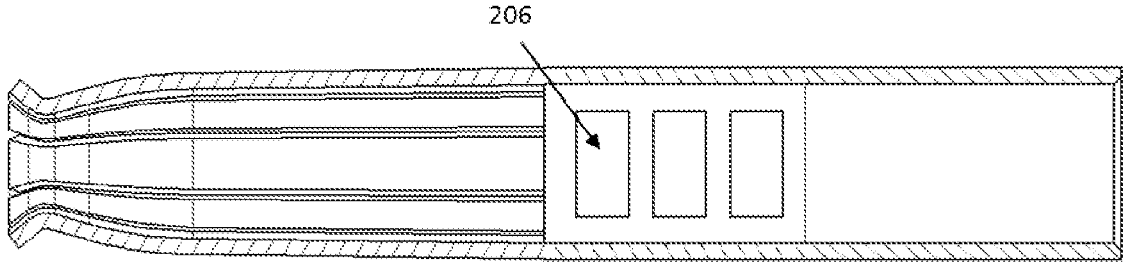
FIG. 2 is a section view of an extension section with machined openings according to the present application.

For the cylindrical terminal of the present application, as shown in FIG. 2, openings 206 are provided on the extension section 201 to enable the assembly portion 202 molded by injection molding to be formed integrally inside and outside the cylindrical tube. The assembly portion 202 is used for being assembled and fixed at an installation position of an electric device, so that the cylindrical terminal can be fixed at the corresponding position of the electrical device and be easily connected to the plug-in terminal 40. If the assembly portion 202 is not fixed stably with the extension section 201, the cylindrical terminal is movable in the electrical device, as a result, the cylindrical terminal is not in stable contact with the plug-in terminal 40, and the plug-in structure cannot achieve better mechanical and electrical properties. The extension section 201 is provided with openings, such that when the assembly portion 202 is injection molded, the fused material of the assembly portion 202 enters the interior of the cylindrical tube through the openings from the exterior of the cylindrical tube, so that the assembly portion 202 and extension section 201 can be securely connected together, to ensure that the assembly portion 202 will not be separated from the extension section 201 during the use of the plug-in structure, so as to ensure stability of the plug-in structure.

In the cylindrical terminal of the present application, the cylindrical tube is a seamless tube, or a seamed tube rolled from a sheet material. In the cylindrical terminal of the present application, since the clamping force is provided mainly by the elasticity of the contact elastic sheets 103, there is no strict requirement on whether the cylindrical tube is closed or not, so the cylindrical tube may be seamless or seamed.

When the cylindrical tube is a seamed tube, the width of the seam of the cylindrical tube shall not be greater than the width of each slot 102 on the contact section 10. In addition, during the machining, no seams can exist on the contact elastic sheets 103, and the slots 102 on the contact section 10 are arranged on the seam of the cylindrical tube to ensure the elasticity of the contact elastic sheets 103, making the cylindrical terminal more stable after being plugged with the plug-in terminal 40.

In the cylindrical terminal of the present application, the shape of the inscribed cross section of the inner surfaces of the arc-shaped structures of the contact section 10 is circular or elliptical or polygonal or flat or E-shaped or F-shaped or H-shaped or K-shaped or L-shaped or T-shaped or U-shaped or V-shaped or W-shaped or X-shaped or Y-shaped or Z-shaped or semi-arc or arc or wavy. The shape of the inscribed cross section of the inner surfaces of the arc-shaped structures of the contact section 10 is designed into various shapes, which is convenient for the designers to select cylindrical terminals of different shapes according to the actual terminal layout environment of the cylindrical terminals, reduce the volume of the plugged structures, optimize the contact area, and improve the electrical performance of the cylindrical terminals. Moreover, the shape of the inscribed cross section of the cylindrical terminal is diverse, so as to be matched with the plug-in terminals of more shapes, which can provide more choices for the designers.

In the cylindrical terminal of the present application, distances between the inner surfaces of the arc-shaped structures of the contact section 10 and the axis of the cylindrical terminal are the same. When the cross-sectional area of the plug-in position of the plug-in terminal 40 is circular, the distances between the positions where the contact elastic sheets are in contact with the plug-in terminal 40 and the axis are the same, so as to ensure that the clamping forces between the contact elastic sheets 103 and the plug-in terminal 40 are substantially the same, so that the plugged structures can obtain stable electrical and mechanical properties and achieve longer service life.

In some embodiments, an outward expanding chamfer is provided at one end of the contact section that is away from the fixing section, and has an angle of 17° to 178°. The front section of the contact section is expanded and opened to guide the insertion of the plug-in terminal 40. The inventor repeatedly performed tests by using different angles. When the angle of the chamfer is smaller than 17°, it is very difficult to insert the plug-in terminal 40 into the contact section 10 directly, and the plug-in connection can be completed by multiple times of insertion. Similarly, when the angle of the chamfer is greater than 178°, the plug-in terminal 40 is very easily abutted against the inner side of the chamfer when being inserted and also needs to be inserted several times to complete the plug-in connection.

The inventor selected ten plug-in terminals with the same diameter and the same width of expandable and contractible seam for testing, in which different chamfer angles are set respectively. The terminals are matched with the same plug-in terminals 40, and 10,000 times of plugging and unplugging experiments are performed, in which the number of times where the plug-in connection is not in place is observed and recorded, and the test results are as shown in Table 1.

In this embodiment, it is ideal if the number of times where the plug-in connection is not in place is less than 5.

TABLE 1

| Influence of Different Chamfer Angles on the Number of Times where the Plug-in Connection of the Plug-in Connection Structure is not in Place | | | | | | | | | | | | | |
|---|---|---|---|---|---|---|---|---|---|---|---|---|---|
| Different Chamfer Angles of Contact Section (°) | | | | | | | | | | | | | |
| 10 | 13 | 17 | 25 | 40 | 50 | 70 | 90 | 110 | 130 | 150 | 170 | 178 | 180 |
| Number of Times where the Plug-in Connection is not in Place | | | | | | | | | | | | | |
| 18 | 9 | 4 | 2 | 1 | 0 | 0 | 0 | 0 | 0 | 1 | 3 | 4 | 22 |

As can be seen from Table 1, when the chamfer angle on the contact section is smaller than 17° and greater than 178°, the number of times where the plug-in terminal 40 inserted into the plug-in terminal is not in place is larger than the ideal value, which cannot ensure the working stability of the plug-in connection structure. If the plug-in connection is not in place, the terminal may be damaged, the service life of the plug-in connection structure may be greatly reduced, the terminal may fail in serious cases, and excessive temperature rise of the plug-in connection structure may cause the electrical device to be burned, resulting in electric shock casualties. Therefore, the inventor sets the angle range of the chamfer of the contact section to be 17° to 178°.

The material of the cylindrical terminal of the present application may be copper or copper alloy with good electrical conductivity and excellent elastic properties. However, with the increasing price of copper, the material cost of using copper as a cylindrical terminal will be higher and higher. The content of metallic aluminium in the earth's crust is about 7.73%, the price of the metallic aluminium is relatively low due to the optimization of the refining technology of metallic aluminum, and aluminum is light in weight compared with copper and is second only to copper in conductivity, so that aluminum can replace some copper in the field of electrical connection. Therefore, aluminum or aluminum alloy with good electrical conductivity and general elastic properties but having lower price may also be selected.

When copper alloy is selected as the material of the cylindrical terminal, exemplarily, copper material contains tellurium material, so that the terminal has good conductive performance and easy cutting property, thereby ensuring the electrical property and improving the processability, in addition, the elasticity of the tellurium-copper alloy is also excellent.

Exemplarily, the content of tellurium in tellurium-copper alloy is 0.1% to 5%, and further exemplarily, the content of tellurium in tellurium-copper alloy is 0.2% to 1.2%.

The inventor selected ten plug-in terminals with the same shape and the same width of expandable and contractible seam for testing, and each terminal is made of a tellurium-copper alloy, in which the tellurium content is 0.05%, 0.1%, 0.2%, 1%, 1.2%, 1.8%, 3%, 5%, 6%, 7%, respectively. The test results are shown in Table 2.

TABLE 2

| Influence of of tellurium-copper alloys with different tellurium contents on electric conductivity | | | | | | | | | | |
|---|---|---|---|---|---|---|---|---|---|---|
| Tellurium content | 0.05% | 0.1% | 0.2% | 1% | 1.2% | 1.8% | 3% | 5% | 6% | 7% |
| Electric conductivity | 93.8% | 95.2% | 97.5% | 97.1% | 98.3% | 96.8% | 96.6% | 94.8% | 93.9% | 92% |

As can be seen from Table 2, when the content of tellurium is less than 0.1% or greater than 5%, the electric conductivity decreases significantly, which cannot meet the actual demand. When the content of tellurium is greater than or equal to 0.2% and less than or equal to 1.2%, the electrical conductivity is the best, so the inventor selects tellurium-copper alloy with a tellurium content of 0.1% to 5%. Most ideally, a tellurium-copper alloy with a tellurium content of 0.2% to 1.2% is selected.

In many cases, the electrical device where the cylindrical terminal of the present application is located works outdoors, thus it is inevitable that water will enter the electrical device. In order to ensure the safety of electrical connection and the service life of the electrical device, a sealing structure is needed on the cylindrical terminal. Since the cylindrical terminal is assembled with the electrical device through the assembly portion 202, it is desirable to provide a first groove 203 at the periphery of the assembly portion 202, and a sealing ring is assembled in the first groove 203. The sealing ring is matched with the interior of the electrical device to effectively seal the electrical device and ensure that external water will not enter the interior of the electrical device. The sealing ring is made of rubber, which has good elasticity and can be extruded and deformed when the cylindrical terminal is assembled with the electrical device, to form a sealing structure to prevent water from entering the electrical device. In addition, the rubber material has good water resistance and oil resistance, which can prolong the service life of the sealing structure.

Figure 3:
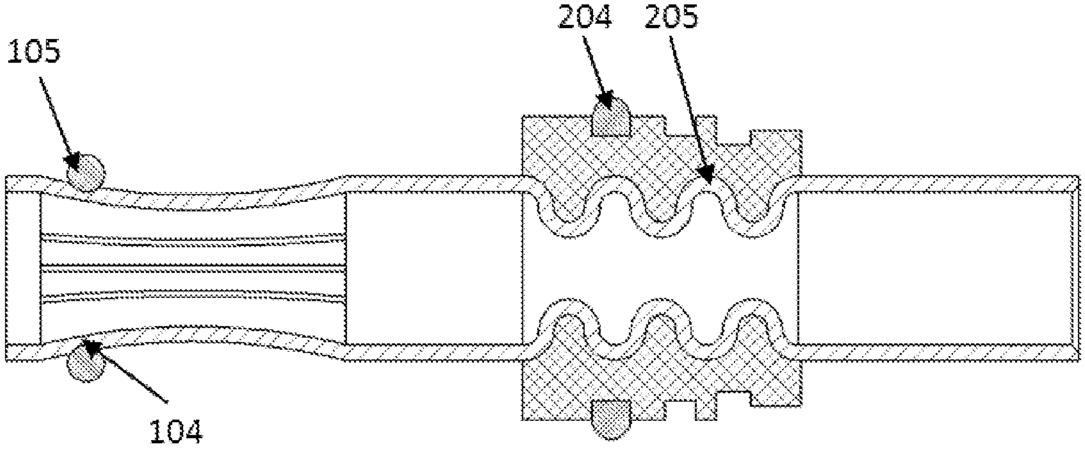
FIG. 3 is a section view of another example of a cylindrical terminal according to the present application.

In the cylindrical terminal of the present application, as shown in FIGS. 1 and 3, the outer side of the contact section 10 is provided with a second groove 104 arranged in a circumferential direction. The second groove 104 is an annular groove, at least one elastic ferrule 105 is sleeved on the second groove 104 to tighten the contact section 10 for a better fit between the contact elastic sheets 103 and the plug-in terminal 40. It should be noted that, due to the use environment, when the cylindrical terminal is designed to have a wall thickness that is too thin, or have a large number of openings, or have a greatly different diameter from the plug-in terminal, the gripping force between the contact elastic sheets 103 and the plug-in terminal 40 will be insufficient, which will cause the contact area between the cylindrical terminal and the plug-in terminal 40 to decrease, and the electrical performance is deteriorated. When the cylindrical terminal itself has insufficient elasticity due to design reasons, the elastic ferrule 105 can be used to supplement the gripping force between the cylindrical terminal and the plug-in terminal 40. The elastic ferrule 105 may be an elastic rubber body or an opened elastic rigid body, which can limit a further outward expansion of the contact elastic sheets 103 of the cylindrical terminal to increase the gripping force between the contact elastic sheets 103 and the plug-in terminal 40.

In the cylindrical terminal of the present application, a plating layer is provided on at least part of the contact section 10 and/or the connecting section 30 to improve corrosion resistance, improve electrical conductivity, increase the number of times of plugging, and better prolong the service life of the contact section 10 and the connecting section 30.

The plating layer can be made by electroplating, chemical plating, magnetron sputtering or vacuum plating or the like.

The electroplating method refers to a process of plating, on a surface of some metal, a thin layer of other metal or alloy by using electrolysis principle.

The chemical plating refers to a deposition process that produces a metal through a controllable oxidation-reduction reaction under a metal catalytic action.

The magnetron sputtering is to use an interaction of a magnetic field and an electric field to make electrons move spirally near a target surface, thereby increasing the probability that electrons bombard argon to generate ions. The generated ions bombard the target surface under the action of the electric field so as to sputter a target material.

The vacuum plating is to deposit various metal and non-metal films on the surface of a part by means of distillation or sputtering under a vacuum condition The plating layer is made of one or more selected from the group consisting of gold, silver, nickel, tin, tin-lead alloy, zinc, silver-antimony alloy, palladium, palladium-nickel alloy, graphite-silver, graphene-silver and silver-gold-zirconium alloy. Copper or aluminum, as an active metal, will undergoes an oxidation reaction with oxygen and water during use, therefore, one or more inactive metals are needed to make the plating layer to prolong the service life of the cylindrical terminal. In addition, for a metal contact that needs to be plugged and unplugged frequently, a metal with good wear resistant is needed to make the plating layer, which can greatly prolong the service life of the contact. In addition, the contact needs excellent conductive property, and the above-mentioned metals have better electric conductivity and stability than the copper or copper alloys, and aluminum or aluminum alloys, thereby making the cylindrical terminal obtain better electrical property and longer service life.

In order to demonstrate the influence of different materials of the plating layer on the overall performance of the cylindrical terminal, the inventor adopted cylindrical terminal samples and plug-in terminals 40 to carry out a series of tests on the number of times of plugging and unplugging and the corrosion resistance time. The cylindrical terminal samples have the same specification and the same material, and have plating layers with different materials. The plug-in terminals 40 have the same specification. The experimental results are shown in Table 3 below.

The numbers of times of plugging and unplugging in Table 3 are obtained as follows: the cylindrical terminals and the plug-in terminals 40 are fixed on an experiment platform respectively; a mechanical device is used to simulate the plugging and unplugging of the cylindrical terminals and the plug-in terminals 40; and after every 100 times of plugging and unplugging, stop the plugging and unplugging and observe the damage of the plating layer on the surface of the cylindrical terminal. When the plating layer on the surface of the cylindrical terminal is scratched and the material of the cylindrical terminal itself is exposed, the experiment is stopped and the number of times of plugging and unplugging at that time is recorded. In this embodiment, if the number of times of plugging and unplugging is less than 8000, it is considered as unqualified.

The test on corrosion resistance time in Table 3 below is to put each cylindrical terminal into a salt fog spraying test chamber, spray salt fog to each position of the cylindrical terminal, and take the cylindrical terminal out every 20 hours to clean the cylindrical terminal and observe surface corrosion of the cylindrical terminal, which is a cycle. When the corrosion area of the surface of the cylindrical terminal is greater than 10% of the total area of the surface of the cylindrical terminal, the test is stopped and the number of cycles at that time is recorded. In this embodiment, if the number of cycles is less than 80, it is considered as unqualified.

TABLE 3

Influence of different materials of the plating layer on the number of times of plugging and unplugging and corrosion resistance of the cylindrical terminal

| Different materials of the plating layer | | | | | | | | | | | |
|---|---|---|---|---|---|---|---|---|---|---|---|
| Gold | Silver | Nickel | Tin | Tin-lead Alloy | Zinc | Silver-antimony Alloy | Palladium | Palladium-nickel Alloy | Graphite-silver | Graphene-silver | Silver-gold-zirconium Alloy |
| Number of Times of Plugging and Unplugging (times) | | | | | | | | | | | |
| 12500 | 11800 | 9500 | 9200 | 9800 | 9500 | 12200 | 12100 | 12200 | 12500 | 12000 | 10000 |
| Number of Corrosion Resistance Test Cycles (times) | | | | | | | | | | | |
| 135 | 120 | 92 | 88 | 89 | 95 | 126 | 118 | 121 | 129 | 130 | 133 |

As can be seen from Table 3 above, when the material of the plating layer is selected from gold, silver, silver-antimony alloy, palladium, palladium-nickel alloy, graphite-silver, graphene-silver and silver-gold-zirconium alloy, the experimental results highly exceed the standard values, and the performance is relatively stable. When the material of the plating layer is selected from nickel, tin, tin-lead alloy and zinc, the experimental results can also meet the requirements. Therefore, the inventor selects the material of the plating layer to be one or more selected from the group consisting of gold, silver, nickel, tin, zinc, tin-lead alloy, silver-antimony alloy, palladium, palladium-nickel alloy, graphite-silver, graphene-silver and silver-gold-zirconium alloy.

The plating layer includes a bottom layer and a surface layer.

In some embodiments, the plating layer is made by a multilayer plating method. After being processed, the contact section 10 and the connecting section 30 actually have many gaps and holes on their surface and below their surface microscopic interfaces, and these gaps and holes will cause wear and corrosion of the contact section 10 and the connecting section 30 during use. Therefore, firstly a bottom layer is plated on the surfaces of the contact section 10 and the connecting section 30, respectively, to fill the gaps and holes, so that the surfaces of the contact section 10 and the connecting section 30 are flat and have no holes, and then a surface layer is plated on the surfaces of the contact section 10 and the connecting section 30, respectively, so that the plating layers are combined with the surfaces more firmly, and the surfaces are more smoothly. Since there are no gaps and holes on the surface of the plating layer, the wear resistance, corrosion resistance and electrical performance of the cylindrical terminal are better, and the service life of the cylindrical terminal is greatly prolonged.

The bottom layer of the plating layer is made of one or more selected from the group consisting of gold, silver, nickel, tin, tin-lead alloy and zinc. The surface layer of the plating layer is made of one or more selected from the group consisting of gold, silver, nickel, tin, tin-lead alloy, zinc, silver-antimony alloy, palladium, palladium-nickel alloy, graphite-silver, graphene-silver and silver-gold-zirconium alloy.

In another embodiment, the bottom layer has a thickness of 0.01 μm to 15 μm. Exemplarily, the bottom layer has a thickness of 0.1 μm to 9 μm.

In another embodiment, the surface layer has a thickness of 0.5 μm to 55 μm. Exemplarily, the surface layer has a thickness of 1 μm to 35 μm.

In order to demonstrate the influence of the thickness of the bottom layer of the plating layer on the overall performance of the cylindrical terminal, the inventor adopted cylindrical terminal samples and plug-in terminals 40 to carry out a series of tests on temperature rise and the corrosion resistance time. The cylindrical terminal samples have the same specification and the same material, have nickel bottom layers of different thicknesses, and have silver surface layers of the same thickness. The plug-in terminals 40 have the same specification. The experimental results are shown in Table 4 below.

The test on temperature rise in Table 4 is to apply the same current to the cylindrical terminals and the plug-in terminals 40 that are respectively plugged with each other, detect the temperatures of the same position of each cylindrical terminal before the current apply and after the temperature is stable in a closed environment, and take a difference between the temperatures to obtain an absolute value. In this embodiment, if the temperature rise is greater than 50K, it is considered as unqualified.

The test on corrosion resistance time in Table 4 is to put each cylindrical terminal into a salt fog spraying test chamber, spray salt fog to each position of the cylindrical terminal, and take the cylindrical terminal out every 20 hours to clean the cylindrical terminal and observe surface corrosion of the cylindrical terminal, which is a cycle. When the corrosion area of the surface of the cylindrical terminal is greater than 10% of the total area of the surface of the cylindrical terminal, the test is stopped and the number of cycles at that time is recorded. In this embodiment, if the number of cycles is less than 80, it is considered as unqualified.

TABLE 4

Influence of different thicknesses of the bottom layer of the plating layer on temperature rise and corrosion resistance of the cylindrical terminal

| Different thicknesses of the nickel bottom layer (μm) | | | | | | | | | | | | | | | |
|---|---|---|---|---|---|---|---|---|---|---|---|---|---|---|---|
| 0.001 | 0.005 | 0.01 | 0.05 | 0.1 | 0.5 | 1 | 3 | 5 | 6 | 9 | 11 | 13 | 15 | 17 | 19 |
| Plug-in Connector Assembly Temperature Rise (k) | | | | | | | | | | | | | | | |
| 10.8 | 12.2 | 14.6 | 16.4 | 18.3 | 21.3 | 24.2 | 26.7 | 28.7 | 31.2 | 35.6 | 40.5 | 43.6 | 47.4 | 58.3 | 67.2 |
| Number of Periods of Corrosion Resistance Test (times) | | | | | | | | | | | | | | | |
| 68 | 78 | 83 | 92 | 103 | 108 | 113 | 117 | 121 | 124 | 127 | 129 | 130 | 131 | 129 | 127 |

As can be seen from Table 4 above, when the thickness of the nickel bottom layer is smaller than 0.01 μm, although the temperature rise of the cylindrical terminal is qualified, the number of corrosion resistance cycles of the cylindrical terminal is smaller than 80 due to the plating layer being too thin, which does not meet the performance requirement of the cylindrical terminal, has a great impact on both the overall performance and service life of the plug-in structure, and may cause the service life of the product to decrease sharply or even failure of the product and combustion accidents in serious cases. When the thickness of the nickel bottom layer is greater than 15 μm, the heat generated by the cylindrical terminal cannot be radiated due to the bottom layer being too thick, which makes the temperature rise of the cylindrical terminal unqualified, and in addition, the thick plating layer is easy to fall off the surface of the cylindrical terminal, resulting in a decrease in the number of cycles of corrosion resistance. Therefore, the inventor selects the thicknesses of the bottom layer of the plating layer to be 0.01 μm to 15 μm. Exemplarily, the inventor finds that when the thickness of the bottom layer of the plating layer is 0.1 μm to 9 μm, the combined effect of the temperature rise and corrosion resistance of the cylindrical terminal is better. Therefore, in order to further improve the safety, reliability and practicality of the product itself, the thickness of the bottom layer of the plating layer is exemplarily 0.1 μm to 9 μm.

In order to demonstrate the influence of the thickness of the surface layer of the plating layer on the overall performance of the cylindrical terminal, the inventor adopted cylindrical terminal samples and plug-in terminals to carry out a series of tests on temperature rise and the corrosion resistance time. The cylindrical terminal samples have the same specification and the same material, have nickel bottom layers of the same thickness, and have silver surface layers of different thicknesses. The plug-in terminals have the same specification. The experimental results are shown in Table 5 below.

The experimental method is the same as above.

TABLE 5

Influence of different thicknesses of the surface layer of the plating layer on temperature rise and corrosion resistance

| Different thicknesses of the silver surface layer (μm) | 0.1 | 0.5 | 1 | 1.5 | 5 | 10 | 15 | 20 | 25 | 30 | 35 | 40 | 45 | 50 | 55 | 60 | 65 |
|---|---|---|---|---|---|---|---|---|---|---|---|---|---|---|---|---|---|
| Temperature Rise of Plug-in structure (k) | 11.2 | 13.9 | 15.1 | 17.2 | 21.3 | 23.4 | 25.5 | 28.1 | 31.2 | 35.2 | 38.5 | 42.9 | 45.2 | 48.0 | 49.9 | 53.6 | 69.5 |
| Number of Corrosion Resistance Test Cycles (times) | 75 | 83 | 90 | 93 | 95 | 97 | 99 | 103 | 106 | 109 | 15 | 117 | 119 | 121 | 125 | 123 | 121 |

As can be seen from Table 5 above, when the thickness of the silver surface layer is smaller than 0.5 μm, although the temperature rise of the cylindrical terminal is qualified, the number of corrosion resistance cycles of the terminal is smaller than 80 due to the plating layer being too thin, which does not meet the performance requirement of the cylindrical terminal, has a great impact on both the overall performance and service life of the plug-in structure, and may cause the service life of the product to decrease sharply or even failure of the product and combustion accidents in serious cases. When the thickness of the silver surface layer is greater than 55 μm, the heat generated by the cylindrical terminal cannot be radiated due to the bottom layer being too thick, which makes the temperature rise of the cylindrical terminal unqualified, and in addition, the thick plating layer is easy to fall off the surface of the terminal, resulting in a decrease in the number of cycles of corrosion resistance. Moreover, since the material the surface layer of the plating layer is expensive metal, if the plating layer has a great thickness but fails to improve performance, it is not valuable for use. Therefore, the inventor selects the silver surface layer to be 0.1 μm to 55 μm. Exemplarily, the inventor finds that when the thickness of the surface layer of the plating layer is 1 μm to 35 μm, the combined effect of the temperature rise and corrosion resistance of the terminal is better. Therefore, in order to further improve the safety, reliability and practicality of the product itself, the thickness of the surface layer of the plating layer is exemplarily 1 μm to 35 μm.

The present application provides a cylindrical terminal, in which a cylindrical tube is used as the terminal material and the assembly portion is produced by injection molding, so as to improve the utilization rate of terminal machining materials, adopt a simple machining process, take short time and greatly reduce the production cost of the terminal. By providing the contact elastic sheets and the elastic ferrule, the cylindrical terminal in use can not only achieve effective contact connection, but also effectively reduce the hidden danger of electric shock casualties and equipment damage caused by poor plug-in connector structure.

Second Embodiment

The cylindrical terminal in this embodiment is basically the same as the cylindrical terminal in the first embodiment, and the differences are as follows.

In the cylindrical terminal of the present application, as shown in FIG. 3, both ends of each slot 102 on the contact section 10 are closed, and both ends of each contact elastic sheet 103 are fixed. Since both ends of such contact elastic sheet 103 are fixed, the middle portion of each contact elastic sheet 103 will deform to obtain a clamping force with the plug-in terminal 40, and can obtain a greater clamping force and a greater contact area as compared with the contact elastic sheet 103 with one end being a free end, thereby ensuring that the plug-in structure of the terminal has better mechanical and electrical properties. But because both ends of the contact elastic sheet 103 are fixed, there is no large amount of deformation, which is suitable for application scenarios where the plug-in terminal 40 has a small tolerance and large conduction current.

In the cylindrical terminal of the present application, the side wall of the extension section 201 is arranged as corrugated shape 205, and the assembly portion 202 is formed at the periphery of the extension section 201. In a case where the conduction current of the cylindrical terminal is excessively large and the cross-sectional area of the terminal is designed without too much margin, it is not suitable to provide an opening on the extension section 201 of the cylindrical terminal, because the opening will reduce the cross-sectional area of the cylindrical terminal, and will increase the resistance to lead to an increase in the heat generation of the cylindrical terminal. In order to ensure that the assembly portion 202 and the extension section 201 can be securely connected, the side wall of the extension section 201 is arranged as corrugated shape 205, and the assembly portion 202 is directly injection molded at the periphery of the extension section 201, so that the inner side of the assembly portion 202 is matched with the corrugated shape 205 of the extension section 201 to obtain a larger contact area, and the assembly portion 202 and the extension section 201 will not axially move relative to each other to ensure the stability of the plug-in structure.

In the cylindrical terminal of the present application, as shown in FIG. 3, a first groove 203 is provided at the periphery of the assembly portion 202, then the cylindrical terminal is put into the mold of the injection molding machine to continue to inject the sealing ring, so that the sealing ring and the assembly portion 202 are formed integrally, which saves the process of sealing ring installation, improves the possibility of assembly line automation, and also makes the sealing ring not leak and not drop, to avoid unqualified sealing of the electrical device due to the leakage and drop. Since the sealing ring and the assembly portion 202 are formed integrally, when the cylindrical terminal is installed, the sealing ring will not rub against the assembly position and will not be separated from the first groove 203, thereby ensuring the stability of the sealing and extending the service life of the electrical device.

Third Embodiment

The cylindrical terminal in this embodiment is basically the same as the cylindrical terminal in the second embodiment, and the differences are as follows.

Figure 4:
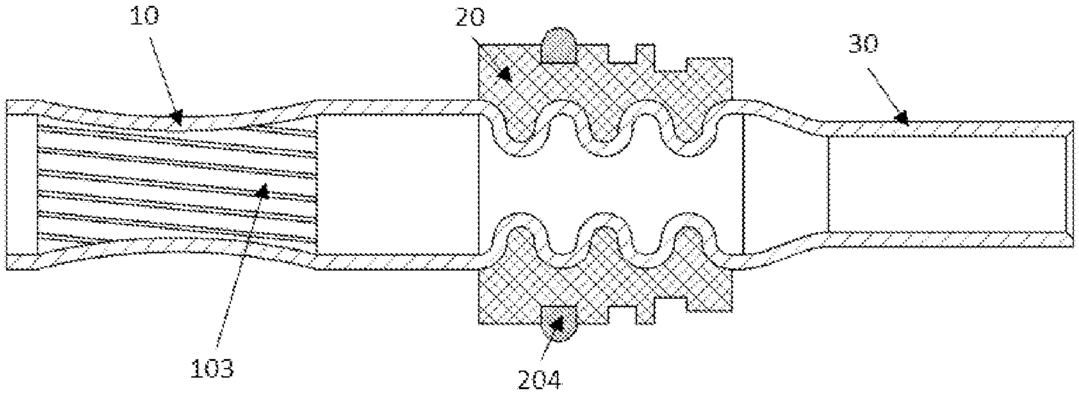
FIG. 4 is a section view of still another example of a cylindrical terminal according to the present application.

In the cylindrical terminal of the present application, as shown in FIG. 4, the slots 102 on the contact section 10 are arranged inclinedly with respect to the axis of the cylindrical terminal. After the cylindrical terminal and the plug-in terminal 40 are mutually plugged with each other, since the slots 102 are arranged inclinedly, the inner surface of the contact elastic sheet 103 and the surface of the plug-in terminal 40 are in spiral contact, which can obtain a larger contact area, reduce the contact resistance of the plug-in structure, and ensure reliable electrical performance. In addition, since the slots 102 are arranged inclinedly, on the premise that the contact elastic sheets 103 have the same length and have the same elasticity, the contact section 10 of the cylindrical terminal can be shorter, which can save the material used in the terminal, and can also reduce the design space of the electrical device, making the electrical device be smaller and lighter, and optimizing the spatial structure of the electrical device.

In the cylindrical terminal of the present application, as shown in FIG. 4, the diameter of the connecting section 30 is smaller than or equal to the diameter of the contact section 10 or the extension section 201. In some use environments, the inner diameter of the cylindrical tube is much larger than the diameter of a connecting portion of the conductor, in this case, if the connecting section 30 and the conductor are connected to each other by crimping or welding, the connecting section 30 will be deformed by a large amount, which will make the connection between the connecting section 30 and the conductor unstable. Therefore, based on the outer diameter of the connecting portion of the conductor to be connected, the inner diameter of the connecting section 30 may be reduced to make the size of the connecting section 30 match the size of the connecting portion of the conductor, so that the crimping or welding process of the connecting section 30 and the connecting portion of the conductor is easier and a more stable electrical connection can be obtained.

Fourth Embodiment

Figure 5:
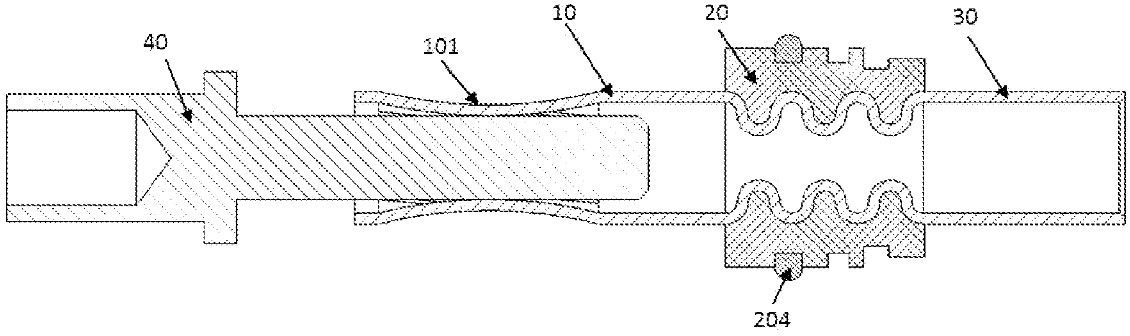
FIG. 5 is a structural schematic diagram of a plug-in connection structure according to the present application.

As shown in FIG. 5, the present application further provides a plug-in connection structure including a cylindrical terminal according to the first embodiment and a plug-in terminal 40. A contact part of the plug-in terminal 40 is inserted into the cavity of the contact section 10 of the cylindrical terminal, and the outer wall of the plug-in terminal 40 is tightly fitted with the inner wall of the cavity of the contact section 10 of the cylindrical terminal. The structure, working principle and beneficial effects of the cylindrical terminals in this embodiment are the same as those in the first embodiment, and will not be repeated herein.

Further, the front end of the plug-in terminal 40 is provided with an insulating protective cap 401 for preventing the terminal surface from being melted, or the electrical device or the assembly portion 202 from being melted due to high arc temperature due to discharge at the contact position when the plug-in terminal 40 is plugged with the cylindrical terminal.

Figure 6:
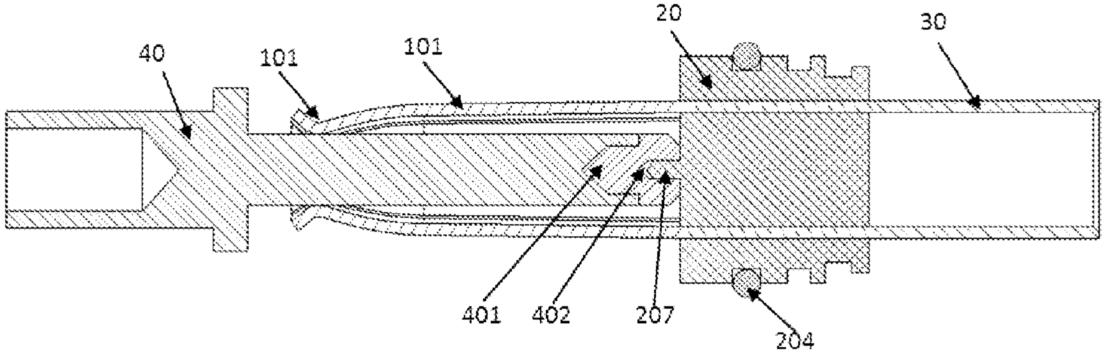
FIG. 6 is a structural schematic diagram of another plug-in connection structure according to the present application.

As shown in FIG. 6, the front end of the plug-in terminal 40 is provided with a positioning hole 402, a positioning pin 207 is provided in the assembly portion 202 of the cylindrical terminal, and the positioning pin 207 and the positioning hole 402 of the plug-in terminal 40 are mutually plugged with each other. In this way, a long plug-in terminal 40 can be positioned in the cylindrical terminal, so that the front end of the plug-in terminal 40 will not shake in the contact section 10 of the cylindrical terminal due to vibration, which not only prevents the change of contact resistance caused by shaking and maintains the current stability of the plug-in connection structure, but also prevents the plug-in terminal 40 from shaking too much to further prevent short circuit caused by mutual contact of the cables connected to the rear end of the terminal, thereby reducing short circuit accidents and electric shock casualties.

Fifth Embodiment

Figure 7:
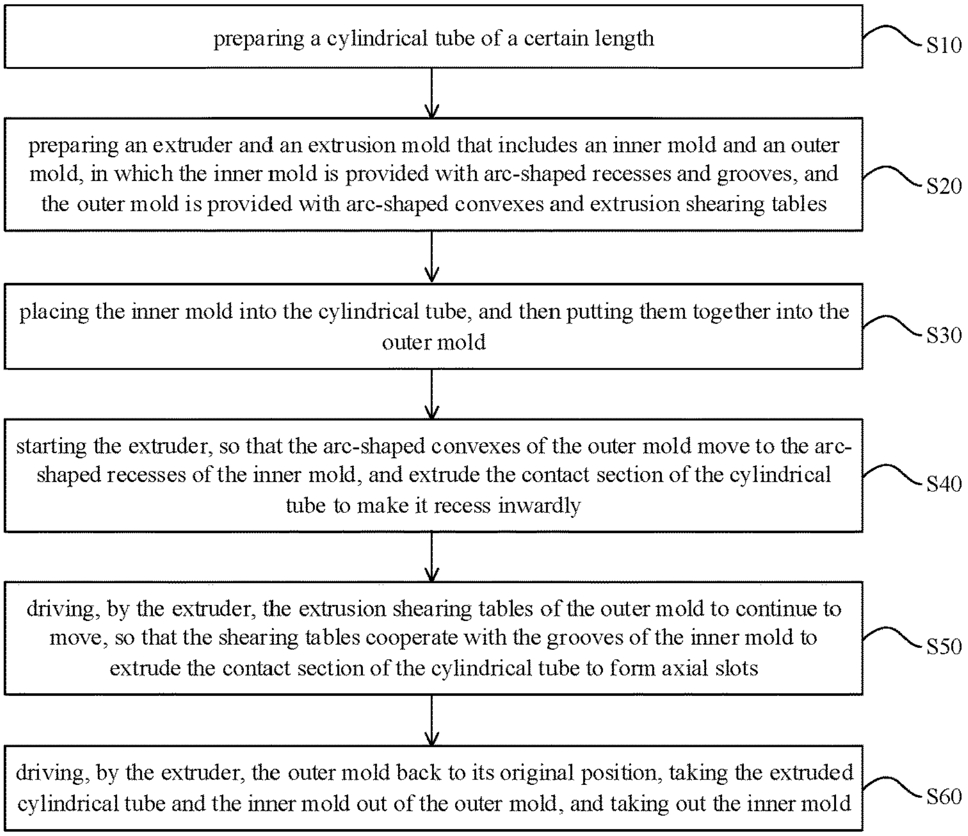
FIG. 7 is a flow schematic diagram of a machining method of a cylindrical terminal according to the first embodiment the present application.

As shown in FIG. 7, the present application further provides a machining method of a cylindrical terminal, including:

A step S10 of preparing a cylindrical tube, including: selecting material of the cylindrical tube according to the requirements of material conductivity and elasticity; selecting size of the inner diameter of the cylindrical tube according to the outer diameter of the plug-in terminal 40; selecting wall thickness of the cylindrical tube according to the conduction current of the cylindrical terminal; selecting length of the cylindrical tube according to the installation space and position of the cylindrical terminal.

A step S20 of preparing an extruder and an extrusion mold that includes an inner mold and an outer mold. The inner mold is provided with arc-shaped recesses 101 and grooves, and the outer mold is provided with arc-shaped convexes and extrusion shearing tables. The dimensions of the inner and outer molds are matched to the cylindrical tube. The arc-shaped recesses 101 on the inner mold are matched with the arc-shaped convexes on the outer mold to machine the depression 101 on the contact section 10 of the cylindrical terminal. The grooves on the inner mold are matched with the extrusion shearing tables on the outer mold to machine the slots 102 on the contact section 10 of the cylindrical terminal.

A step S30 of placing the inner mold into the cylindrical tube, and then putting them together into the outer mold.

A step S40 of starting the extruder, so that the arc-shaped convexes of the outer mold move to the arc-shaped recesses of the inner mold, and extrude the contact section of the cylindrical tube to make it recess inwardly. The arc-shaped convexes of the outer mold are arranged circumferentially, are driven by a driving device respectively, and move towards the axis of the cylindrical terminal until the extrusion-molded depression 101 of the contact section 10 are formed.

A step S50 of driving, by the extruder, the extrusion shearing tables of the outer mold to continue to move, so that the shearing tables cooperate with the grooves of the inner mold to extrude the contact section 10 of the cylindrical tube to form axial slots 102. The extrusion shearing tables of the outer mold are arranged circumferentially, are driven by a driving device respectively, and move towards the axis of the cylindrical terminal until the shear-molded slots 102 of the contact section 10 are formed.

A step S60 of driving, by the extruder, the outer mold back to its original position, taking the extruded cylindrical tube and the inner mold out of the outer mold, and taking out the inner mold.

In some embodiments, the step S50 includes using a shearing device to shear or cut the contact section of the cylindrical tube to form axial slots.

Sixth Embodiment

Figure 8:
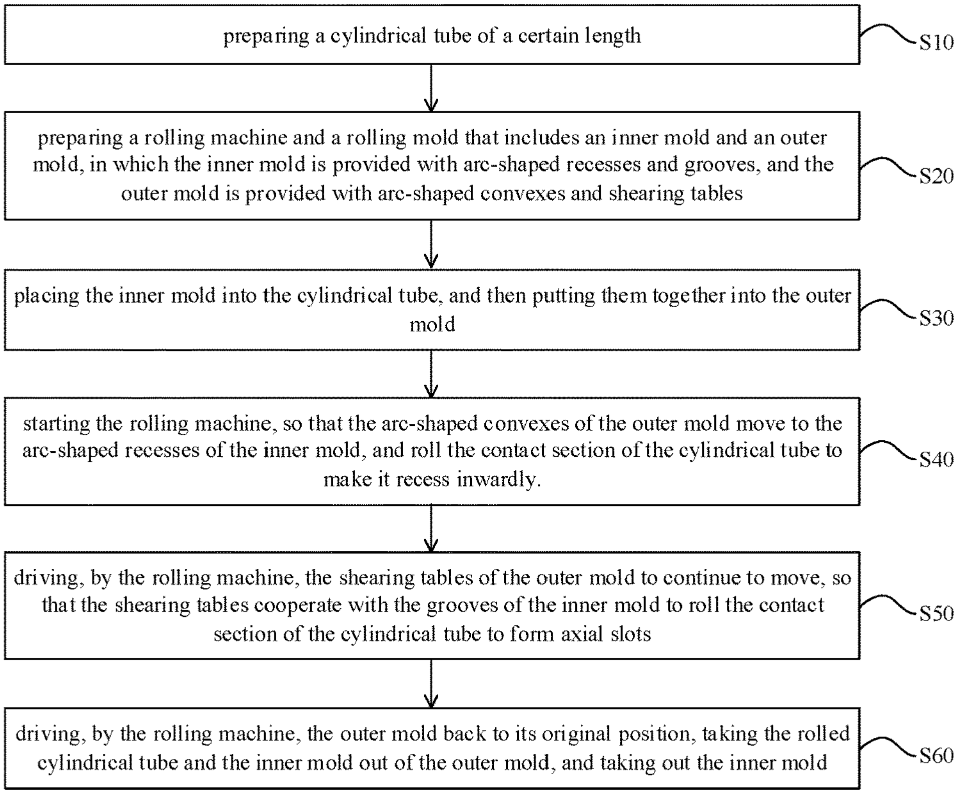
FIG. 8 is a flow schematic diagram of a machining method of a cylindrical terminal according to the second embodiment of the present application.

As shown in FIG. 8, the present application further provides another machining method of a cylindrical terminal, including:

A step S10 of preparing a cylindrical tube, including: selecting material of the cylindrical tube according to the requirements of material conductivity and elasticity; selecting size of the inner diameter of the cylindrical tube according to the outer diameter of the plug-in terminal 40; selecting wall thickness of the cylindrical tube according to the conduction current of the cylindrical terminal; selecting length of the cylindrical tube according to the installation space and position of the cylindrical terminal.

A step S20 of preparing a rolling machine and a rolling mold that includes an inner mold and an outer mold. The inner mold is provided with arc-shaped recesses 101 and grooves, and the outer mold is provided with arc-shaped convexes and shearing tables. The dimensions of the inner and outer molds are matched to the cylindrical tube. The arc-shaped recesses on the inner mold are matched with the arc-shaped convexes on the outer mold to machine the depression 101 on the contact section 10 of the cylindrical terminal. The grooves on the inner mold are matched with the extrusion shearing tables on the outer mold to machine the slots 102 on the contact section 10 of the cylindrical terminal.

A step S30 of placing the inner mold into the cylindrical tube, and then putting them together into the outer mold.

A step S40 of starting the rolling machine, so that the arc-shaped convexes of the outer mold move to the arc-shaped recesses of the inner mold, and roll the contact section 10 of the cylindrical tube to make it recess inwardly. The outer mold is divided into an upper mold and a lower mold, the lower mold remains stationary, and the upper mold is driven as a whole to move closely to the lower mold. The upper and the lower molds roll the cylindrical tube between the upper and lower molds by rolling relative to each other, and cooperate with the inner mold to roll mold the depression 101 on the contact section 10.

A step S50 of driving, by the rolling machine, the shearing tables of the outer mold to continue to move, so that the shearing tables cooperate with the grooves of the inner mold to roll the contact section 10 of the cylindrical tube to form axial slots 102.

A step S60 of driving, by the rolling machine, the outer mold back to its original position, taking the rolled cylindrical tube and the inner mold out of the outer mold, and taking out the inner mold.

In some embodiments, the step S50 includes using a shearing device to shear or cut the contact section of the cylindrical tube to form axial slots.

This embodiment differs from the first embodiment merely in that the machining device adopted are different, and is the same as the first embodiment in that the manufactured cylindrical terminals are the same.

Seventh Embodiment

Figure 9:
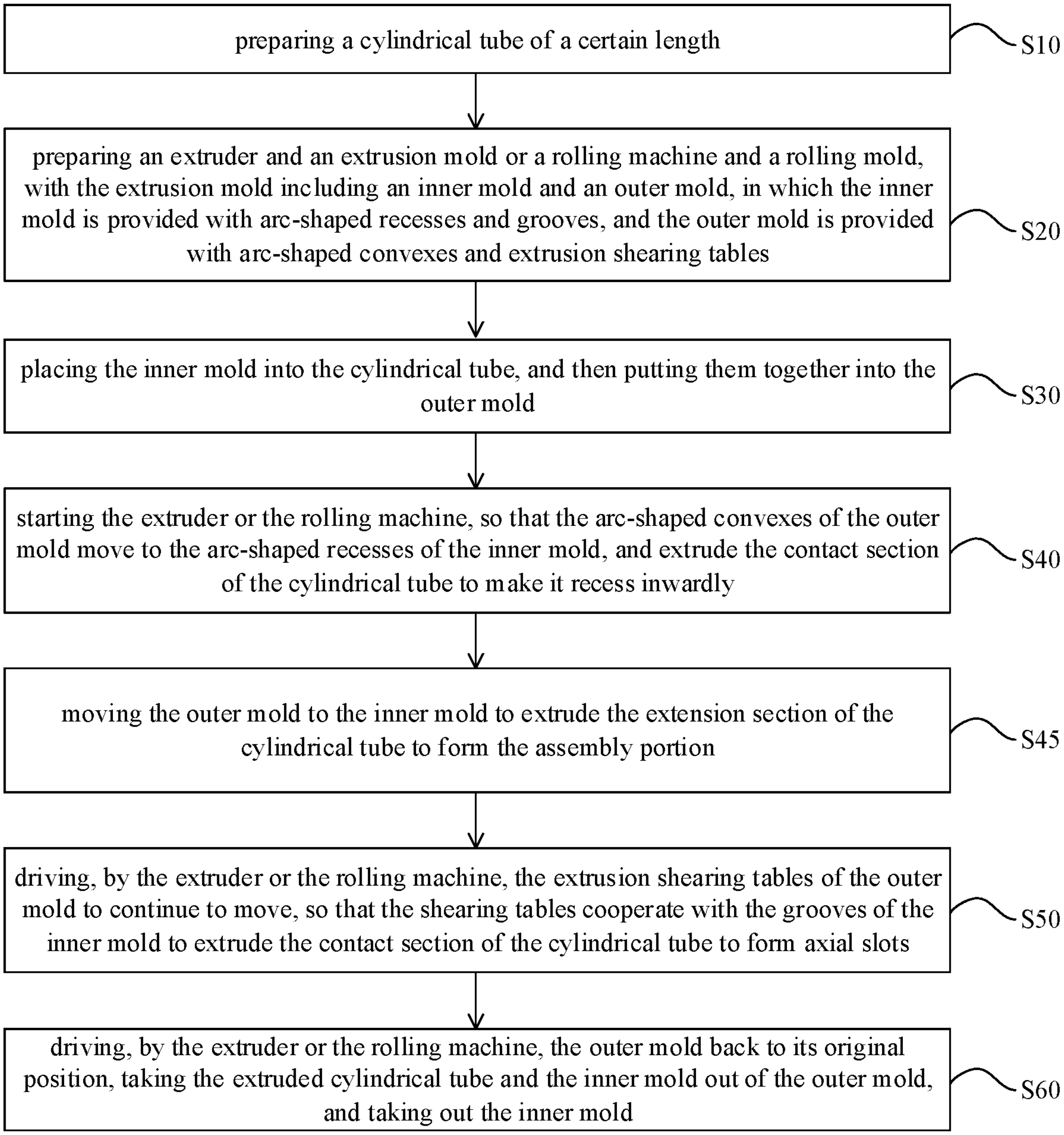
FIG. 9 is a flow schematic diagram of a machining method of a cylindrical terminal according to the third embodiment of the present application.

As shown in FIG. 9, the present application further provides another machining method of a cylindrical terminal, including:

the machining method of this embodiment is basically the same as that of the fifth embodiment and the sixth embodiment, except that after the step S40, the machining method of this embodiment further includes a step S45 of moving the outer mold to the inner mold to extrude the extension section of the cylindrical tube to form the assembly portion.

Eighth Embodiment

Figure 10:
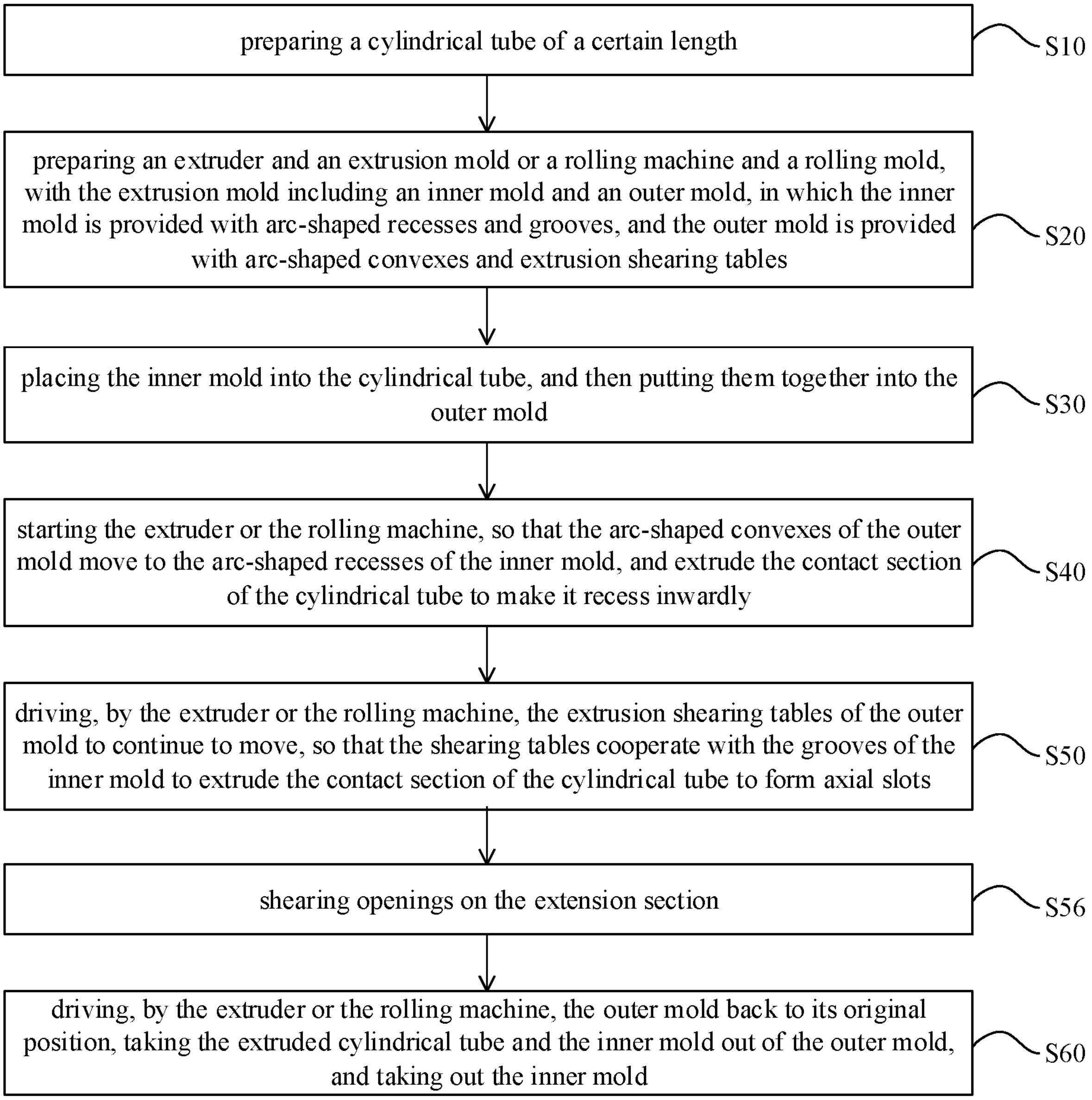
FIG. 10 is a flow schematic diagram of a machining method of a cylindrical terminal according to the fourth embodiment of the present application.

As shown in FIG. 10, the present application further provides another machining method of a cylindrical terminal, including:

the machining method of this embodiment is basically the same as that of the fifth embodiment and the sixth embodiment, except that after the step S50, the machining method of this embodiment further includes a step S56 of shearing openings on the extension section 201, in which the openings may be extrusion molded or roll molded together with the slots 102 on the contact section 10.

Ninth Embodiment

Figure 11:
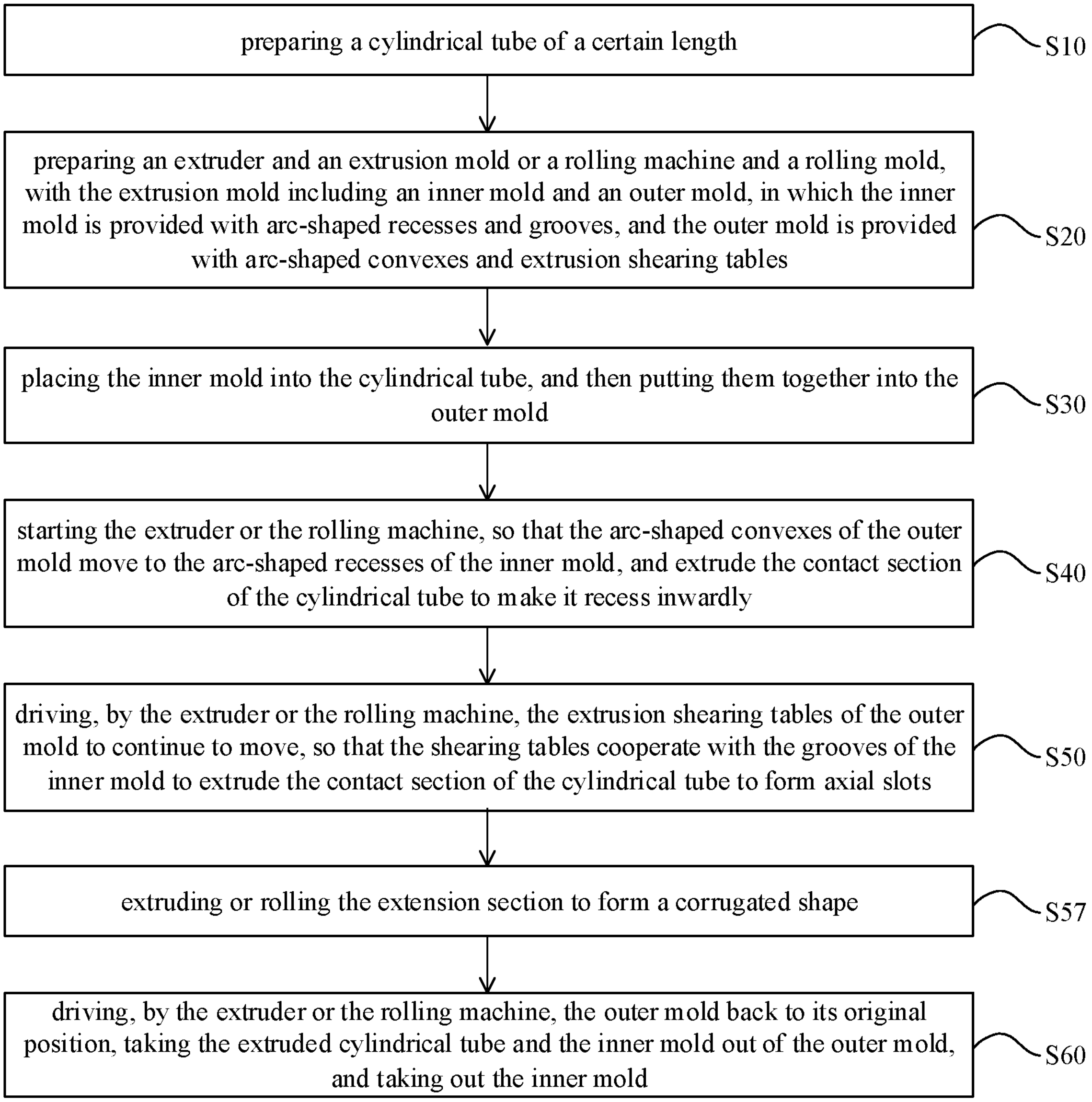
FIG. 11 is a flow schematic diagram of a machining method of a cylindrical terminal according to the fifth embodiment of the present application.

As shown in FIG. 11, the present application further provides another machining method of a cylindrical terminal, including:

the machining method of this embodiment is basically the same as that of the fifth embodiment and the sixth embodiment, except that after the step S50, the machining method of this embodiment further includes a step S57 of extruding or rolling the extension section 201 to form a corrugated shape 205, in which the corrugated shape 205 may be extrusion molded or roll molded together with the depression 101 on the contact section 10.

Tenth Embodiment

Figure 12:
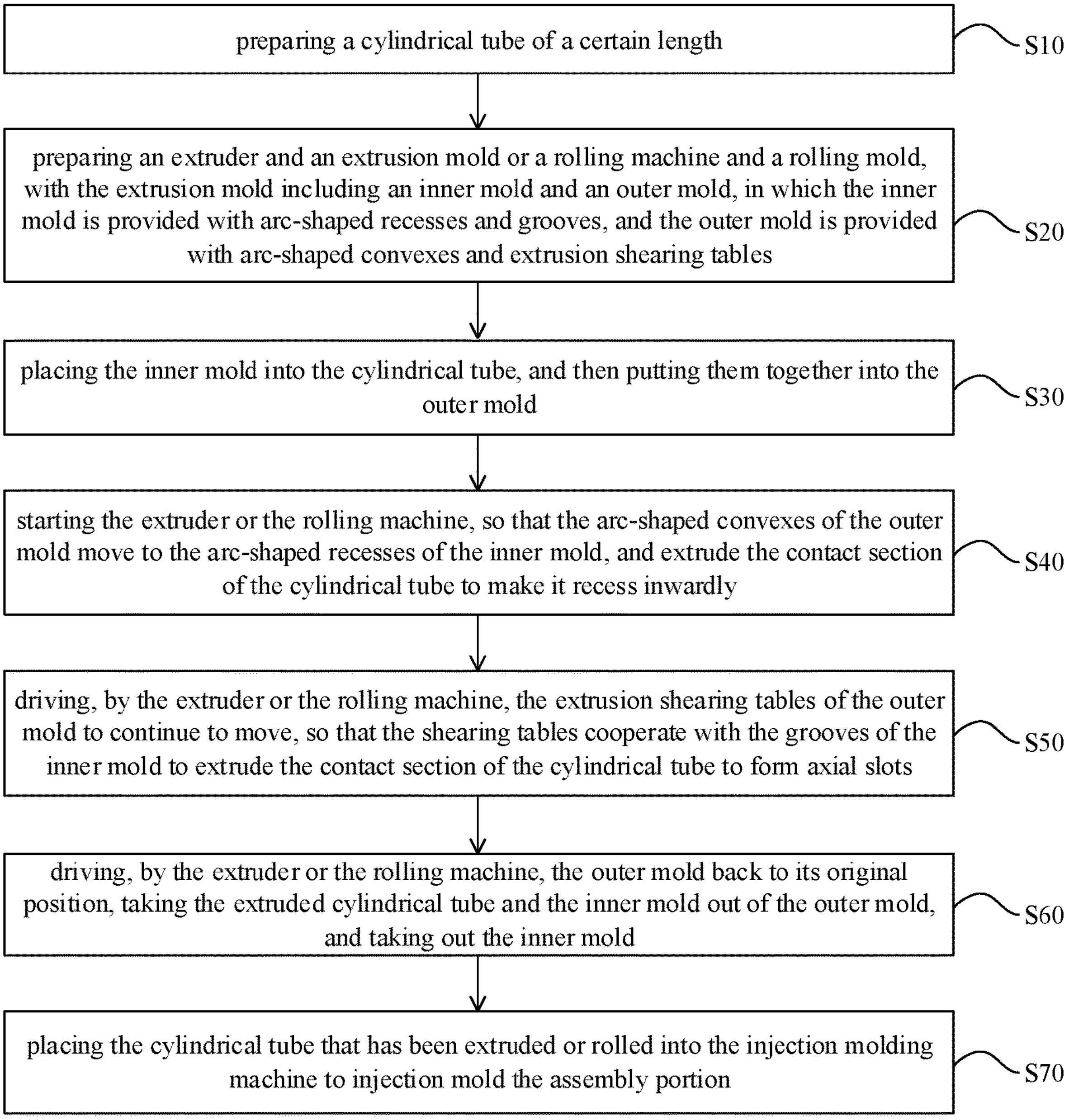
FIG. 12 is a flow schematic diagram of a machining method of a cylindrical terminal according to the sixth embodiment of the present application.

As shown in FIG. 12, the present application further provides another machining method of a cylindrical terminal, including:

the machining method of this embodiment is basically the same as that of the fifth embodiment and the sixth embodiment, except that after the step S50, the machining method of this embodiment further includes a step S70 of placing the cylindrical tube that has been extruded or rolled into the injection molding machine to injection mold the assembly portion.

Eleventh Embodiment

Figure 13:
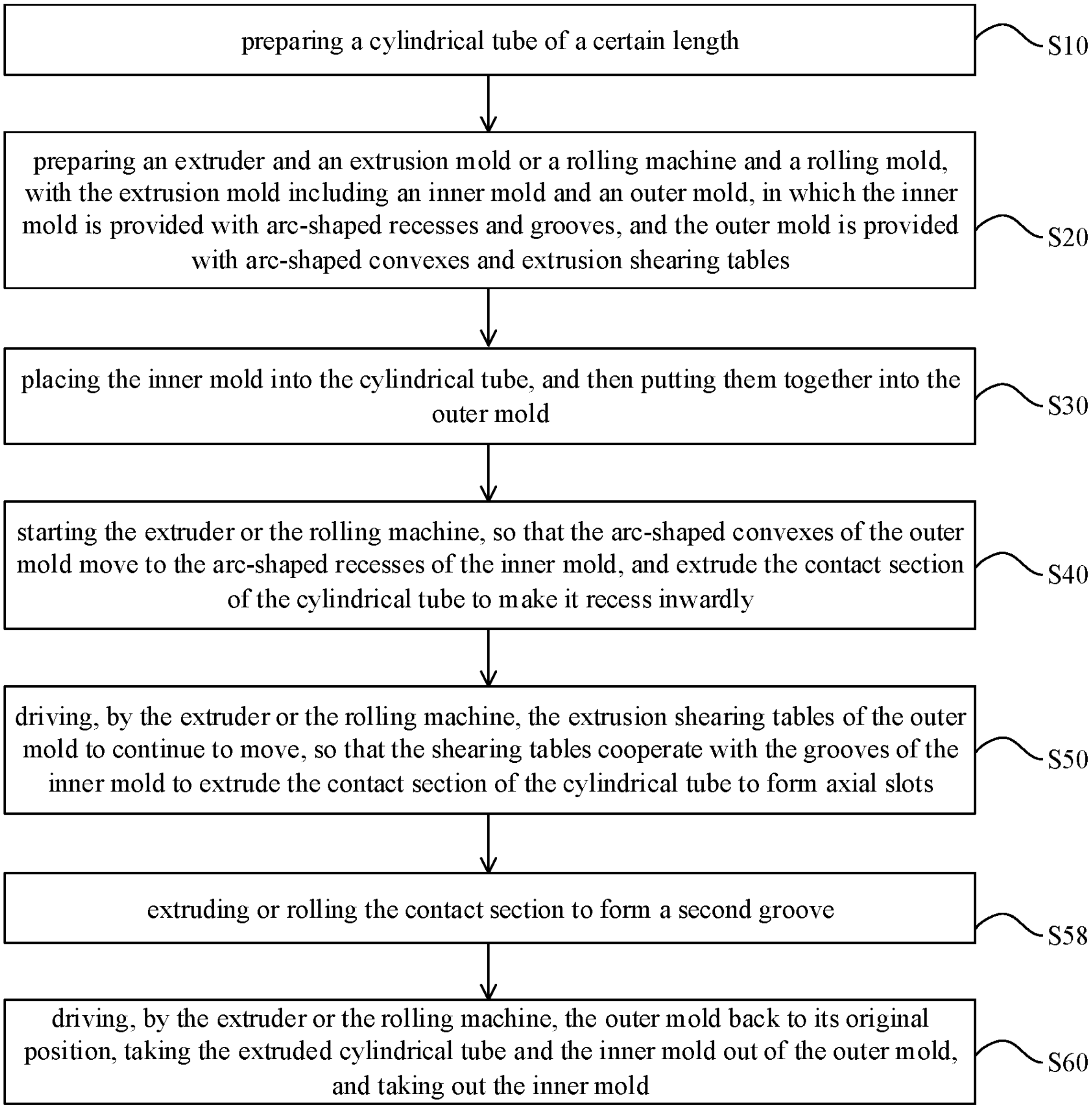
FIG. 13 is a flow schematic diagram of a machining method of a cylindrical terminal according to the seventh embodiment of the present application.

As shown in FIG. 13, the present application further provides another machining method of a cylindrical terminal, including:

the machining method of this embodiment is basically the same as that of the fifth embodiment and the sixth embodiment, except that after the step S50, the machining method of this embodiment further includes a step S58 of extruding or rolling the contact section 10 to form a second groove 104, in which the second groove 104 may be extrusion molded or roll molded together with the depression 101 on the contact section 10.

Twelfth Embodiment

Figure 14:
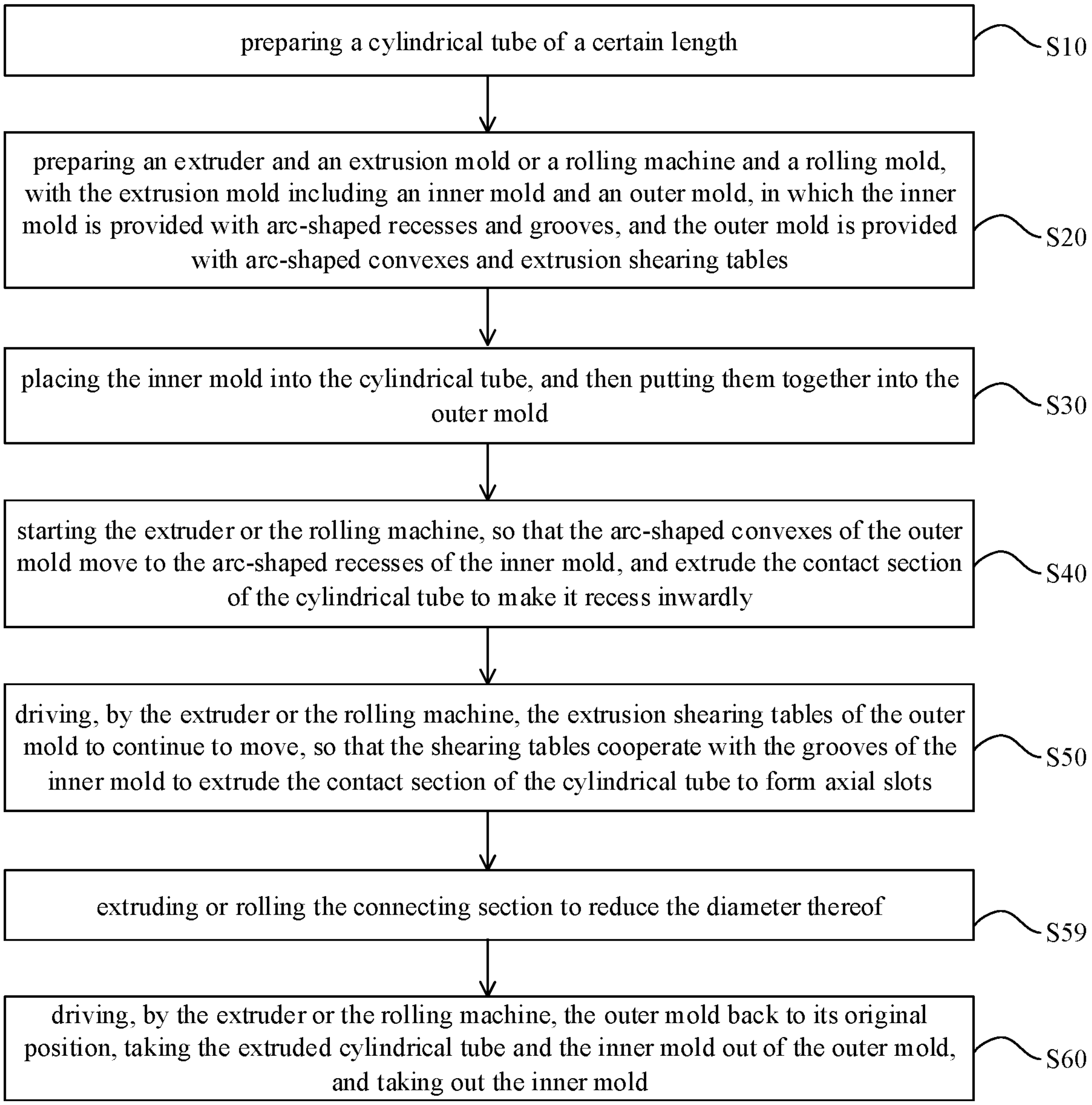
FIG. 14 is a flow schematic diagram of a machining method of a cylindrical terminal according to the eighth embodiment of the present application.

As shown in FIG. 14, the present application further provides another machining method of a cylindrical terminal, including:

the machining method of this embodiment is basically the same as that of the fifth embodiment and the sixth embodiment, except that after the step S50, the machining method of this embodiment further includes a step S59 of extruding or rolling the connecting section 30 to reduce the diameter thereof, in which the connecting section 30 may be extruded or rolled together with the depression 101 on the contact section 10.

Thirteenth Embodiment

Figure 15:
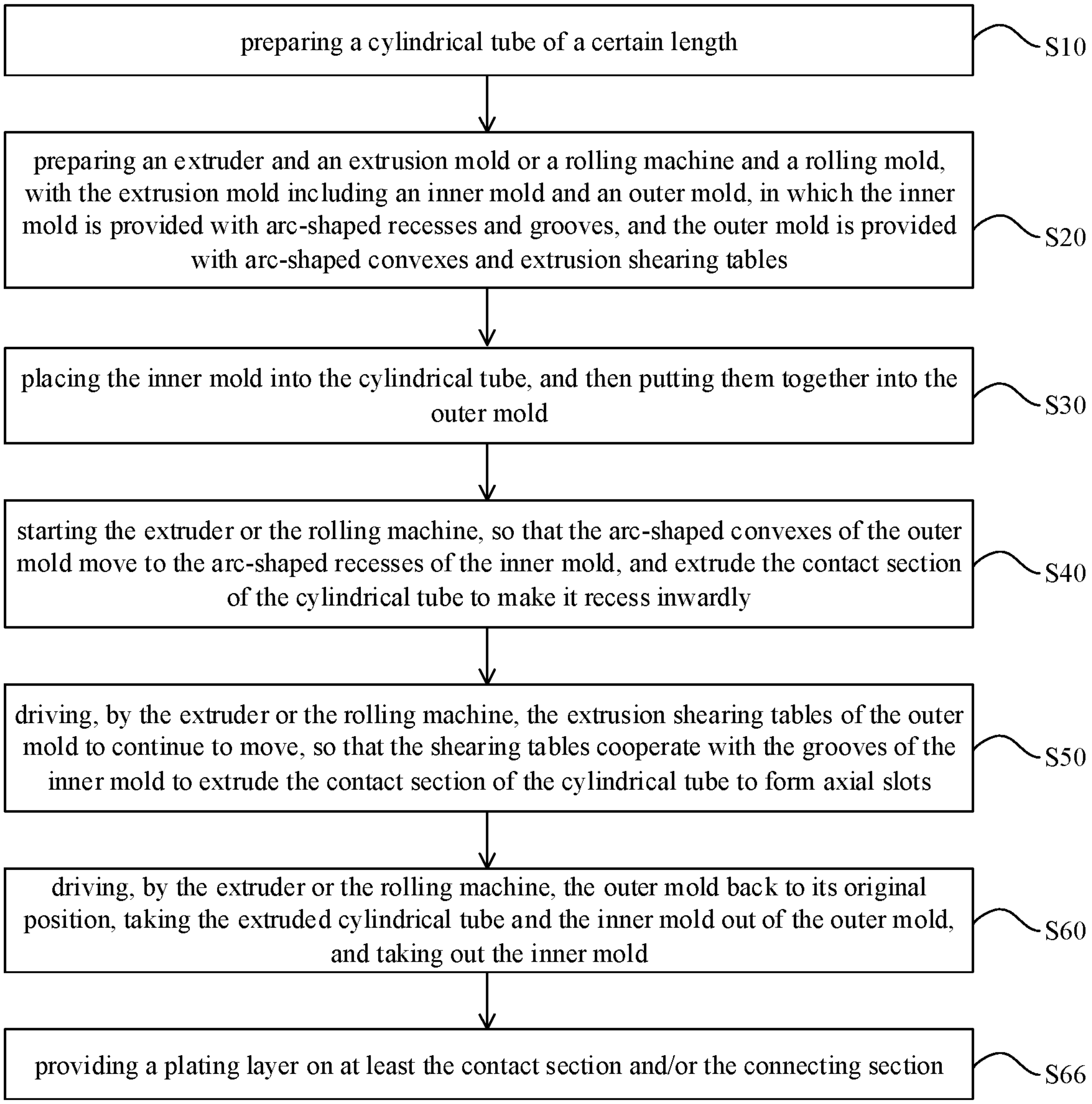
FIG. 15 is a flow schematic diagram of a machining method of a cylindrical terminal according to the ninth embodiment of the present application.

As shown in FIG. 15, the present application further provides another machining method of a cylindrical terminal, including:

the machining method of this embodiment is basically the same as that of the fifth embodiment and the sixth embodiment, except that after the step S60, the machining method of this embodiment further includes a step S66 of providing a plating layer on at least the contact section 10 and/or the connecting section 30.

Fourteenth Embodiment

Figure 16:
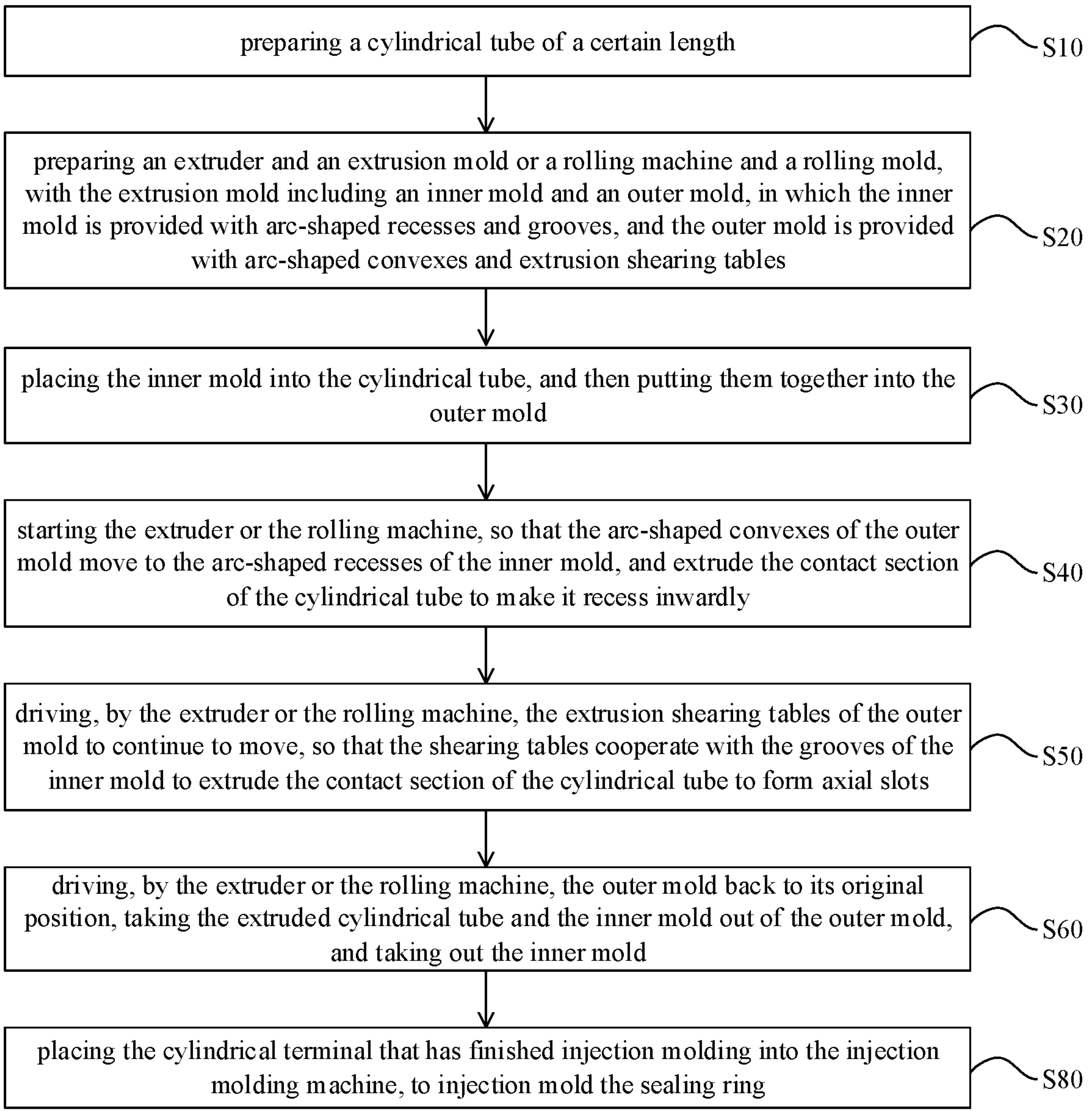
FIG. 16 is a flow schematic diagram of a machining method of a cylindrical terminal according to the tenth embodiment of the present application.

As shown in FIG. 16, the present application further provides another machining method of a cylindrical terminal, including:

the machining method of this embodiment is basically the same as that of the fifth embodiment and the sixth embodiment, except that after the step S60, the machining method of this embodiment further includes a step S80 of placing the cylindrical terminal that has finished injection molding into the injection molding machine, to injection mold the sealing ring.

Fifteenth Embodiment

Figure 17:
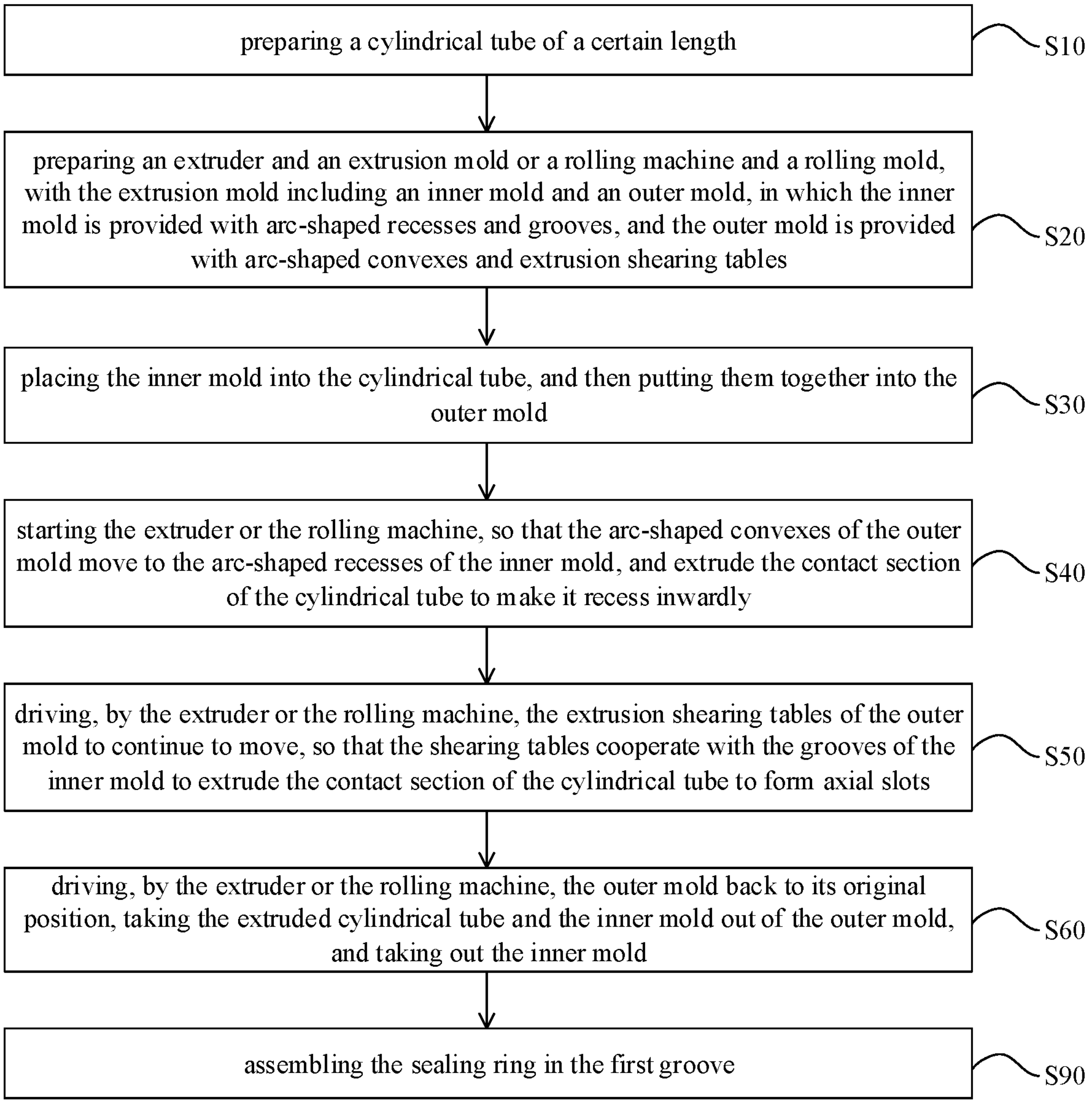
FIG. 17 is a flow schematic diagram of a machining method of a cylindrical terminal according to the fifteenth embodiment of the present application.

As shown in FIG. 17, the present application further provides another machining method of a cylindrical terminal, including:

the machining method of this embodiment is basically the same as that of the fifth embodiment and the sixth embodiment, except that after the step S60, the machining method of this embodiment further includes a step S90 of assembling the sealing ring in the first groove 203.

Sixteenth Embodiment

Figure 18:
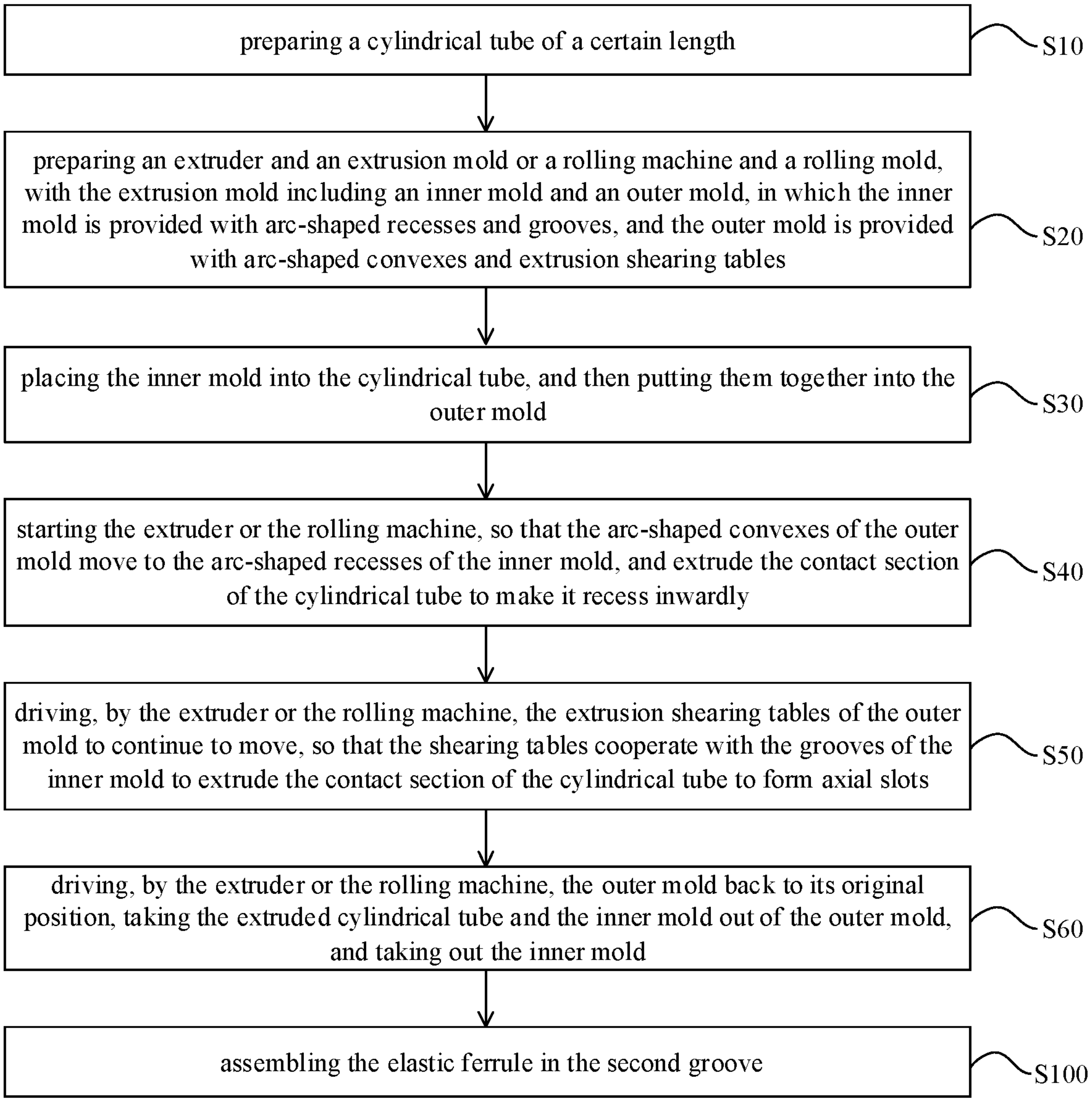
FIG. 18 is a flow schematic diagram of a machining method of a cylindrical terminal according to the sixteenth embodiment of the present application.

As shown in FIG. 18, the present application further provides another machining method of a cylindrical terminal, including:

the machining method of this embodiment is basically the same as that of the fifth embodiment and the sixth embodiment, except that after the step S70, the machining method of this embodiment further includes a step S100 of assembling the elastic ferrule 105 in the second groove 104.

Although the implementation of the present application has been disclosed as above, it is not limited to the applications listed in the specification and the embodiments, and it can surely be applied to various fields suitable for the present application. Additional modifications can be easily implemented by those skilled in the art, and therefore the present application is not limited to specific details and the drawings shown and described herein, without departing from the general concepts defined by the claims and the scope of equivalents.

What is claimed is:

1. A cylindrical terminal, comprising a contact section, a fixing section and a connecting section;

wherein the fixing section comprises an extension section and an assembly portion disposed on the extension section;

the contact section, the extension section and the connecting section are integrally formed as a cylindrical tube;

the contact section is provided with at least two axial slots, which divide a side wall of the contact section into at least two contact elastic sheets;

the contact section is provided with a depression that is recessed radially inward, such that the contact elastic sheets form arc-shaped structures; and the connecting section is used to be electrically connected to a wire;

wherein a first groove is provided at a periphery of the assembly portion, the cylindrical terminal further comprises a sealing ring that is sleeved on the first groove and made of a rubber material.

2. The cylindrical terminal according to claim 1, wherein, the slots penetrate through one end of the contact section that is away from the fixing section, and one end of each contact elastic sheet is a free end.

3. The cylindrical terminal according to claim 1, wherein, both ends of each slot are closed, and both ends of each contact elastic sheet are fixed.

4. The cylindrical terminal according to claim 1, wherein, a width of one end of each slot that is close to the fixing section is greater than or equal to a width of one end of the slot that is away from the fixing section.

5. The cylindrical terminal according to claim 1, wherein, the slots are arranged inclinedly with respect to an axis of the cylindrical terminal.

6. The cylindrical terminal according to claim 1, wherein, the assembly portion is formed by extruding the extension section.

7. The cylindrical terminal according to claim 1, wherein, the assembly portion is made of a plastic material, and the assembly portion is formed on the extension section by injection molding;

an opening is provided in the extension section to enable the assembly portion to be formed integrally inside and outside the cylindrical tube; and a side wall of the extension section is in a corrugated shape, and the assembly portion is formed at a periphery of the extension section.

8. The cylindrical terminal according to claim 1, wherein, the cylindrical tube is a seamless tube, or a seamed tube rolled from a sheet material; and when the cylindrical tube is a seamed tube, there is no seam on the contact elastic sheets.

9. The cylindrical terminal according to claim 1, wherein, distances between inner surfaces of the arc-shaped structures and an axis of the cylindrical terminal are the same; and a diameter of the connecting section is smaller than or equal to a diameter of the contact section or the extension section.

10. The cylindrical terminal according to claim 1, wherein, an outward expanding chamfer is provided at one end of the contact section that is away from the fixing section and has an angle of 17° to 178°.

11. The cylindrical terminal according to claim 1, wherein, the cylindrical tube is made of copper or copper alloy, or aluminum or aluminum alloy;

when the cylindrical tube is made of copper alloy, the copper alloy contains copper material containing tellurium material; and the cylindrical tube has a content of tellurium of 0.1% to 5%.

12. The cylindrical terminal according to claim 1, wherein, an outer side of the contact section is provided with a second groove arranged in a circumferential direction, the cylindrical terminal further comprises an elastic ferrule that is sleeved on the second groove and made of a rubber material.

13. The cylindrical terminal according to claim 1, wherein, a plating layer is provided on at least part of the contact section and/or the connecting section;

the plating layer comprises a bottom layer and a surface layer; and the bottom layer is made of one or more selected from the group consisting of gold, silver, nickel, tin, tin-lead alloy and zinc; and the surface layer is made of one or more selected from the group consisting of gold, silver, nickel, tin, tin-lead alloy, zinc, silver-antimony alloy, palladium, palladium-nickel alloy, graphite-silver, graphene-silver and silver-gold-zirconium alloy.

14. The cylindrical terminal according to claim 13, wherein, the bottom layer has a thickness of 0.01 μm to 15 μm; and the surface layer has a thickness of 0.5 μm to 55 μm.

15. A plug-in connection structure, comprising a cylindrical terminal and a plug-in terminal, wherein the cylindrical terminal comprises a contact section, a fixing section and a connecting section;

the fixing section comprises an extension section and an assembly portion disposed on the extension section;

the contact section, the extension section and the connecting section are integrally formed as a cylindrical tube;

the contact section is provided with at least two axial slots, which divide a side wall of the contact section into at least two contact elastic sheets;

the contact section is provided with a depression that is recessed radially inward, such that the contact elastic sheets form arc-shaped structures;

the connecting section is used to be electrically connected to a wire;

the plug-in terminal is inserted into the contact section, an outer side wall of the plug-in terminal is closely fitted with inner side walls of the contact elastic sheets;

a positioning pin is provided in the assembly portion of the cylindrical terminal, a front end of the plug-in terminal is provided with a positioning hole, and the positioning pin is inserted into the positioning hole.

16. A machining method for manufacturing a cylindrical terminal, wherein the cylindrical terminal comprises a contact section, a fixing section and a connecting section;

the fixing section comprises an extension section and an assembly portion disposed on the extension section;

the contact section, the extension section and the connecting section are integrally formed as a cylindrical tube;

the contact section is provided with at least two axial slots, which divide a side wall of the contact section into at least two contact elastic sheets;

the contact section is provided with a depression that is recessed radially inward, such that the contact elastic sheets form arc-shaped structures;

the connecting section is used to be electrically connected to a wire;

wherein the machining method comprises:

step S10: preparing a cylindrical tube;

step S20: preparing an extruder and a mold that comprises an inner mold and an outer mold, wherein the inner mold is provided with arc-shaped recesses and first grooves, and the outer mold is provided with arc-shaped convexes and shearing tables;

step S30: placing the inner mold into the cylindrical tube, and then putting them together into the outer mold;

step S40: starting the extruder, wherein the arc-shaped convexes of the outer mold move to the arc-shaped recesses of the inner mold, and extrude the contact section of the cylindrical tube to make it recess inwardly;

step S50: driving, by the extruder, the shearing tables of the outer mold to continue to move, so that the shearing tables cooperate with the first grooves of the inner mold to extrude the contact section of the cylindrical tube to form axial slots; and step S60: driving, by the extruder, the outer mold back to its original position, taking the extruded cylindrical tube and the inner mold out of the outer mold, and taking out the inner mold.

17. The machining method of a cylindrical terminal according to claim 16, wherein the step S50 comprises: shearing or cutting the contact section of the cylindrical tube to form axial slots;

after the step S40, the machining method further comprises a step S45 of moving the outer mold to the inner mold to extrude the extension section of the cylindrical tube to form the assembly portion;

after the step S50, the machining method further comprises a step S56 of shearing the extension section to obtain an opening; and after the step S50, the machining method further comprises a step S57 of extruding or rolling the extension section to make it in a corrugated shape.

18. The machining method of a cylindrical terminal according to claim 16, wherein, after the step S60, the machining method further comprises a step S70 of placing the cylindrical tube that has been extruded or rolled into an injection molding machine to form the assembly portion by injection molding;

after the step S50, the machining method further comprises a step S58 of extruding or rolling the contact section to form a second groove;

after the step S50, the machining method further comprises a step S59 of extruding or rolling the connecting section to reduce its diameter;

after the step S60, the machining method further comprises a step S66 of providing a plating layer on at least the contact section and/or the connecting section;

after the step S60, the machining method further comprises a step S80 of placing the cylindrical tube that has been extruded or rolled into an injection molding machine to form a sealing ring by injection molding;

after the step S60, the machining method further comprises a step S90 of assembling the sealing ring in the first groove; and after the step S60, the machining method further comprises a step S100 of assembling the elastic ferrule in the second groove.

* * * * *